(12) United States Patent
Lee et al.

(10) Patent No.: US 9,547,203 B2
(45) Date of Patent: Jan. 17, 2017

(54) LIQUID CRYSTAL DISPLAY

(71) Applicant: SAMSUNG DISPLAY CO., LTD., Yongin, Gyeonggi-do (KR)

(72) Inventors: Se Hyun Lee, Seoul (KR); Ka Eun Kim, Yongin-si (KR); Ki Chul Shin, Seongnam-si (KR); Ho Kil Oh, Yongin-si (KR); Hak Sun Chang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/695,023

(22) Filed: Apr. 23, 2015

(65) Prior Publication Data

US 2015/0316821 A1    Nov. 5, 2015

(30) Foreign Application Priority Data

May 2, 2014    (KR) .................. 10-2014-0053406

(51) Int. Cl.
*G02F 1/1343*    (2006.01)
*G02F 1/1333*    (2006.01)
*G02F 1/1337*    (2006.01)

(52) U.S. Cl.
CPC ..... *G02F 1/134336* (2013.01); *G02F 1/13439* (2013.01); *G02F 1/133345* (2013.01);
(Continued)

(58) Field of Classification Search
CPC .................. G02F 1/134309; G02F 1/134345; G02F 1/133707
(Continued)

(56) References Cited

U.S. PATENT DOCUMENTS 6,384,889 B1 * 5/2002 Miyachi ............ G02F 1/133707
349/129
2007/0070273 A1 * 3/2007 Yoshida ............ G02F 1/133555
349/114
(Continued)

FOREIGN PATENT DOCUMENTS

JP    2007-226175 A    9/2007
KR    10-0623985 B1    9/2006
(Continued)

*Primary Examiner* — Lucy Chien
(74) *Attorney, Agent, or Firm* — Lewis Roca Rothgerber Christie LLP

(57) ABSTRACT

A liquid crystal display including a first substrate, a pixel electrode on the first substrate and including a first subpixel electrode and a second subpixel electrode separated from the first subpixel electrode, a second substrate facing the first substrate, a common electrode on the second substrate, and a liquid crystal layer between the first substrate and the second substrate, wherein the first subpixel electrode includes a first plate-shaped portion and first branch electrodes extending from the first plate-shaped portion, wherein the second subpixel electrode includes a second plate-shaped portion configured to enclose surroundings of the first branch electrode and second branch electrodes extending from the second plate-shaped portion, and wherein a difference between a first voltage applied to the first subpixel electrode and a common voltage applied to the common electrode is larger than a difference between a second voltage applied to the second subpixel electrode and the common voltage.

19 Claims, 24 Drawing Sheets

(52) U.S. Cl.
 CPC .. *G02F 1/133707* (2013.01); *G02F 1/134309* (2013.01); *G02F 2001/134318* (2013.01); *G02F 2001/134345* (2013.01); *G02F 2001/134354* (2013.01)

(58) Field of Classification Search
 USPC .................................. 349/141, 143, 144, 39
 See application file for complete search history.

(56) References Cited

U.S. PATENT DOCUMENTS

| | | | |
|---|---|---|---|
| 2008/0079512 A1* | 4/2008 | Nakazawa | H03H 9/0057 333/133 |
| 2014/0211142 A1* | 7/2014 | Kim | G02F 1/133707 349/138 |

FOREIGN PATENT DOCUMENTS

| | | |
|---|---|---|
| KR | 10-0670061 B1 | 1/2007 |
| KR | 10-2007-0100549 A | 10/2007 |
| KR | 10-0885014 B1 | 2/2009 |
| KR | 10-2012-0100565 A | 9/2012 |

\* cited by examiner (a)

(b)

(a)

(b)

(a)

(b)

(a)

(b)

LIQUID CRYSTAL DISPLAY

CROSS-REFERENCE TO RELATED APPLICATION

This application claims priority to and the benefit of Korean Patent Application No. 10-2014-0053406, filed in the Korean Intellectual Property Office on May 2, 2014, the entire content of which is incorporated herein by reference.

BACKGROUND

1. Field

Aspects of one or more embodiments of the present invention relate to a liquid crystal display.

2. Description of the Related Art

A liquid crystal display, which is one of the most common types (kinds) of flat panel displays currently in use, includes two sheets of display panels with field generating electrodes such as a pixel electrode, a common electrode, or the like; and a liquid crystal layer interposed between the two sheets. In the liquid crystal layer, a voltage is applied to the field generating electrode to generate an electric field in the liquid crystal layer. Then, the alignment of liquid crystal molecules of the liquid crystal layer is determined by the electric field to control the polarization of incident light, thereby displaying images.

Different LCDs have been developed, including a vertical alignment (VA) mode LCD, which aligns LC molecules such that their long axes are substantially perpendicular to (or normal to) the panels in the absence of an electric field.

In the vertical alignment (VA) mode LCD, a wide viewing angle can be realized by cutouts such as minute slits in the field-generating electrodes to form a plurality of domains.

In the case of a method in which the minute slits are formed in the pixel electrode to have a plurality of branch electrodes, the liquid crystal molecules may be controlled even in a central region of each domain, but an aperture ratio of the liquid crystal display is reduced.

Meanwhile, in the case of the vertically aligned mode liquid crystal display, in order to make the side visibility approach (or match) that of the front visibility, a method of varying transmittance by dividing one pixel into two subpixels and applying different voltages of the two subpixels is proposed.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a liquid crystal display capable of controlling liquid crystal molecules on a boundary between two subpixels without deteriorating (e.g., reducing) an aperture ratio of the liquid crystal display while side visibility approximates (e.g., approaches or matches) front visibility.

According to an embodiment of the present invention, there is provided a liquid crystal display including: a first substrate; a pixel electrode on the first substrate and including a first subpixel electrode and a second subpixel electrode separated from the first subpixel electrode; a second substrate facing the first substrate; a common electrode on the second substrate; and a liquid crystal layer between the first substrate and the second substrate, wherein the first subpixel electrode includes a first plate-shaped portion and a plurality of first branch electrodes extending from the first plate-shaped portion, wherein the second subpixel electrode includes a second plate-shaped portion configured to enclose surroundings of the first branch electrode and a plurality of second branch electrodes extending from the second plate-shaped portion, and wherein a difference between a first voltage applied to the first subpixel electrode and a common voltage applied to the common electrode is larger than a difference between a second voltage applied to the second subpixel electrode and the common voltage.

In an embodiment, the liquid crystal display further includes an insulating layer between the first subpixel electrode and the second subpixel electrode, wherein the first subpixel electrode is on the insulating layer and the second subpixel electrode is under the insulating layer, and wherein an edge of the first branch electrode overlaps an edge of the second plate-shaped portion.

In an embodiment, the common electrode has a cross-shaped cutout, and the first plate-shaped portion of the first subpixel electrode overlaps a center portion of the cross-shaped cutout.

In an embodiment, the first plate-shaped portion of the first subpixel electrode has a planar shape of a rhombus, and the second plate-shaped portion of the second subpixel electrode has a planar shape including a plurality of trapezoid shapes.

In an embodiment, the plurality of first branch electrodes of the first subpixel electrode includes a first minute branch, a second minute branch, a third minute branch, and a fourth minute branch extending in different directions, and the plurality of second branch electrodes of the second subpixel electrode include a fifth minute branch, a sixth minute branch, a seventh minute branch, and an eighth minute branch extending in different directions.

In an embodiment, the liquid crystal display further includes: an insulating layer under the first subpixel electrode and the second subpixel electrode; and a third electrode under the insulating layer, wherein the third electrode overlaps, and is between, the first branch electrode of the first subpixel electrode and the second plate-shaped portion of the second subpixel electrode.

In an embodiment, the third electrode is configured to receive a voltage of substantially the same magnitude as the first subpixel electrode.

In an embodiment, the common electrode has a cross-shaped cutout, and the first plate-shaped portion of the first subpixel electrode overlaps a center portion of the cross-shaped cutout.

In an embodiment, the first plate-shaped portion of the first subpixel electrode has a planar shape of a rhombus, and the second plate-shaped portion of the second subpixel electrode has a planar shape including a plurality of trapezoid shapes.

In an embodiment, the plurality of first branch electrodes of the first subpixel electrode include a first minute branch, a second minute branch, a third minute branch, and a fourth minute branch extending in different directions, and wherein the plurality of second branch electrodes of the second subpixel electrode include a fifth minute branch, a sixth minute branch, a seventh minute branch, and an eighth minute branch extending in different directions.

In an embodiment, the common electrode has a cross-shaped cutout, and the first plate-shaped portion of the first subpixel electrode overlaps a center portion of the cross-shaped cutout.

In an embodiment, the first plate-shaped portion of the first subpixel electrode has a planar shape of a rhombus, and the second plate-shaped portion of the second subpixel electrode has a planar shape including a plurality of trapezoid shapes.

In an embodiment, the plurality of first branch electrodes of the first subpixel electrode include a first minute branch, a second minute branch, a third minute branch, and a fourth minute branch extending in different directions; and the plurality of second branch electrodes of the second subpixel electrode include a fifth minute branch, a sixth minute branch, a seventh minute branch, and an eighth minute branch extending in different directions.

In an embodiment, a distance between the first subpixel electrode and the second subpixel electrode, as measured along a direction substantially parallel with an extending direction of any one of the plurality of first branch electrodes and the plurality of second branch electrodes, is less than or equal to about 4 μm, and a ratio of the voltage applied to the second subpixel electrode to the voltage applied to the first subpixel electrode is less than or equal to about 0.83.

In an embodiment, a distance between the first subpixel electrode and the second subpixel electrode, as measured along a direction substantially parallel with an extending direction of any one of the plurality of first branch electrodes and the plurality of second branch electrodes, is greater than about 4 μm and less than or equal to about 4.5 μm, and a ratio of the voltage applied to the second subpixel electrode to the voltage applied to the first subpixel electrode is less than or equal to about 0.75.

In an embodiment, a distance between the first subpixel electrode and the second subpixel electrode, as measured along a direction substantially parallel with an extending direction of any one of the plurality of first branch electrodes and the plurality of second branch electrodes is greater than or equal to about 5 μm, and a ratio of the voltage applied to the second subpixel electrode to the voltage applied to the first subpixel electrode is less than or equal to about 0.7.

In an embodiment, one-half of an entire width of the first plate-shaped portion of the first subpixel electrode, as measured along a direction substantially parallel with an extending direction of any one of the plurality of first branch electrodes and the plurality of second branch electrodes, is less than or equal to about 25 μm.

In an embodiment, a width of the second plate-shaped portion of the second subpixel electrode, as measured along a direction substantially parallel with an extending direction of any one of the plurality of first branch electrodes and the plurality of second branch electrodes, is less than or equal to about 25 p.m.

In an embodiment, lengths of the plurality of first branch electrodes and the plurality of second branch electrodes are less than or equal to about 25 μm.

Accordingly, in the liquid crystal display, according to the example embodiment of the present invention, it is possible to control liquid crystal molecules on a boundary between two subpixels without deteriorating (e.g., reducing) an aperture ratio of the liquid crystal display while side visibility approaches (or matches) front visibility and the luminance of the liquid crystal display increases.

DETAILED DESCRIPTION

Figure 1:
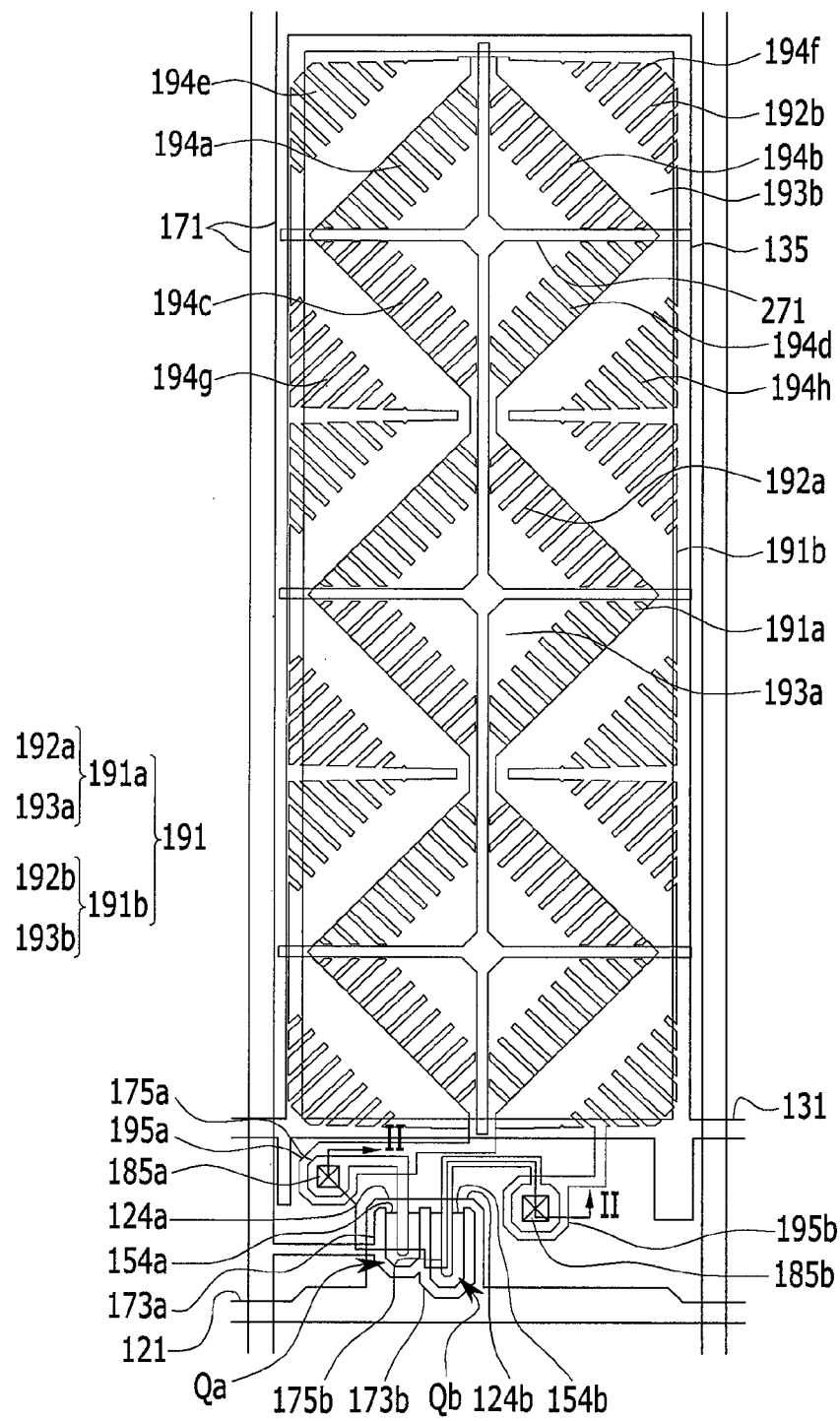
FIG. 1 is a layout view of a liquid crystal display according to an example embodiment of the present invention.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. As used herein, the term "substantially," "about," and similar terms are used as terms of approximation and not as terms of degree, and are intended to account for the inherent deviations in measured or calculated values that would be recognized by those of ordinary skill in the art.

Next, a liquid crystal display according to an example embodiment of the present invention will be described with reference to FIG. 1 and FIG. 2. FIG. 1 is a layout view illustrating a liquid crystal display according to an example embodiment of the present invention, and FIG. 2 is a cross-sectional view of the liquid crystal display of FIG. 1 taken along the line II-II.

Figure 2:
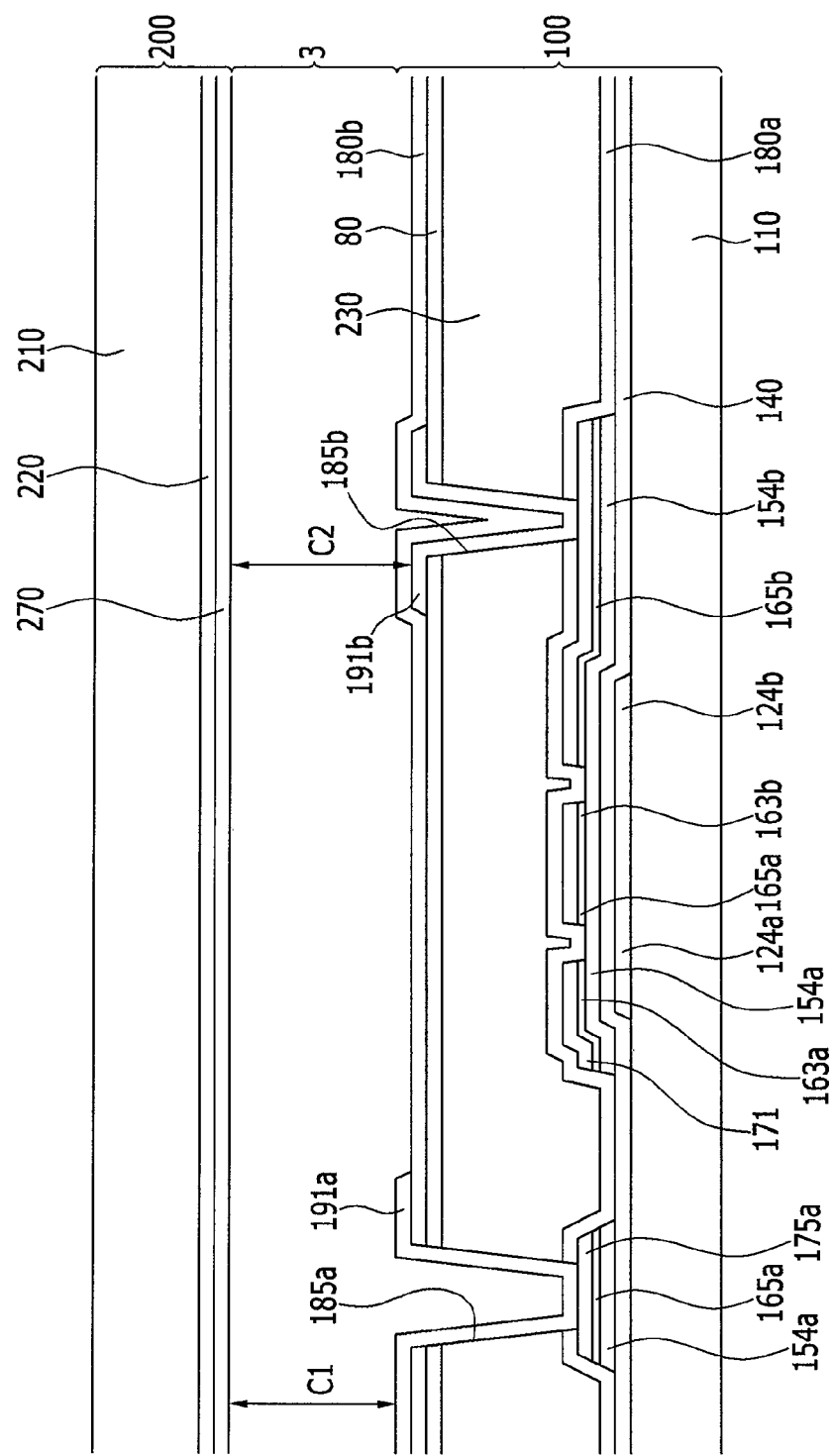
FIG. 2 is a cross-sectional view of the liquid crystal display of FIG. 1 taken along the line II-II.

Referring to FIG. 1 and FIG. 2, the liquid crystal display according to the example embodiment includes a lower panel 100 and an upper panel 200 facing each other, a liquid crystal layer 3 interposed between the two panels 100 and 200, and a pair of polarizers attached to outer surfaces of the panels 100 and 200.

First, the lower panel 100 will be described.

A gate line 121, a reference voltage line 131, and a storage electrode 135 are formed on a first substrate 110. The gate line 121 mainly (or substantially) extends in a horizontal direction and transfers a gate signal.

The gate line 121 includes a first gate electrode 124a and a second gate electrode 124b, and a wide end portion for coupling with (e.g., connection with) another layer or an external driving circuit.

The reference voltage line 131 includes the storage electrode 135 surrounding a pixel area.

A gate insulating layer 140 is formed on the gate line 121, the reference voltage line 131, and the storage electrode 135.

A first semiconductor 154a and a second semiconductor 154b, which may be made of amorphous or crystalline silicon, are formed on the gate insulating layer 140.

A plurality of ohmic contacts 163a, 163b, 165a, and 165b are formed on the first semiconductor 154a and the second semiconductor 154b. When the semiconductors 154a and 154b are oxide semiconductors, the ohmic contact may be omitted.

A data line 171 including a first source electrode 173a and a second source electrode 173b, a first drain electrode 175a, and a second drain electrode 175b are formed on the ohmic contacts 163a, 163b, 165a, and 165b and the gate insulating layer 140.

The first gate electrode 124a, the first source electrode 173a, and the first drain electrode 175a form a first thin film transistor Qa together with the first semiconductor 154a, and a channel of the first thin film transistor is formed in the first semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, and a channel of the second thin film transistor is formed in the second semiconductor 154b between the second source electrode 173b and the second drain electrode 175b.

A first passivation layer 180a is formed on the data line 171, the first drain electrode 175a, and the second drain electrode 175b.

A color filter 230 is formed on the first passivation layer 180a.

A light blocking member 220 may be disposed on an area in which the color filter 230 is not disposed and a portion of the color filter 230. The light blocking member is referred to as a black matrix and substantially prevents (e.g., prevents) light from leaking.

A capping layer 80 is disposed on the color filter 230. The capping layer 80 reduces (e.g., prevents) the color filter 230 from lifting and suppresses the liquid crystal layer 3 from being polluted due to an organic material, such as a solvent inflowing from the color filter, thereby reducing (e.g., preventing) defects, such as an afterimage, which may occur at the time of driving the screen, from occurring.

A second subpixel electrode 191b is formed on the overcoat 80. The second subpixel electrode 191b includes a basic electrode 199 shown in FIG. 3 or at least one variation thereof.

A second passivation layer 180b is formed on the second subpixel electrode 191b.

A first subpixel electrode 191a is formed on the second passivation layer 180b.

Figure 3:
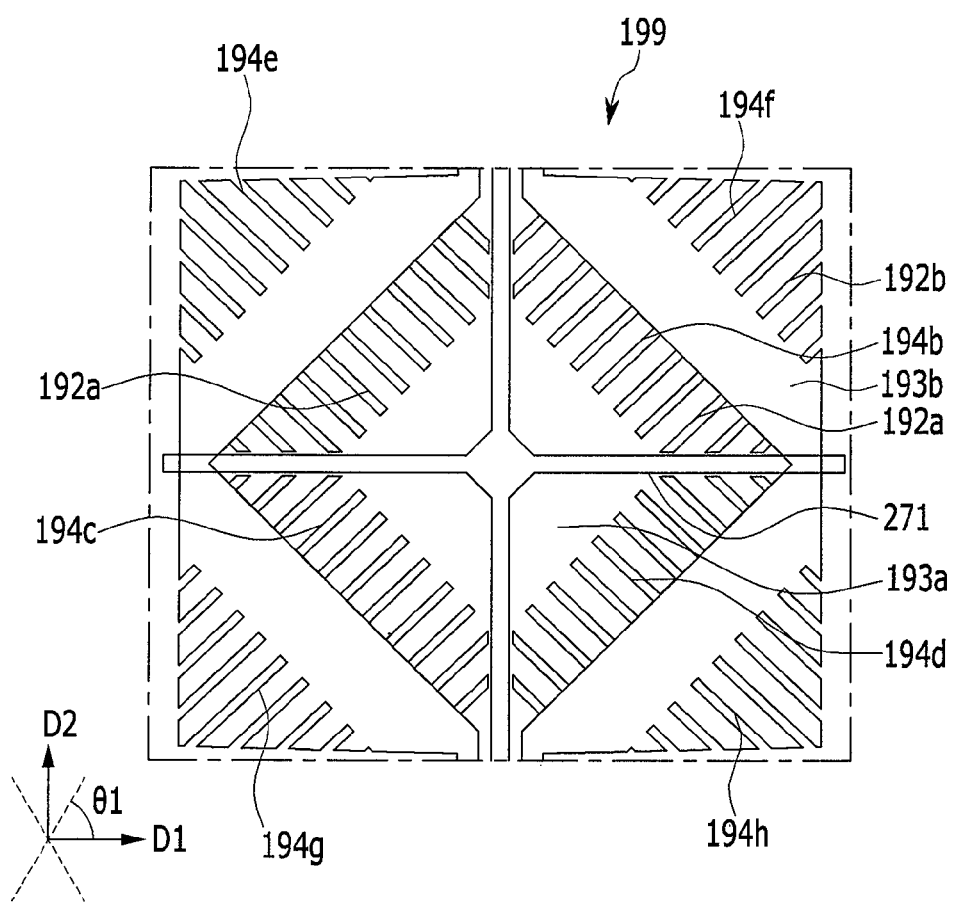
FIG. 3 is a plan view illustrating a basic region of a field generating electrode of the liquid crystal display according to the example embodiment of the present invention.

The first subpixel electrode 191a includes a basic electrode 199 shown in FIG. 3 or at least one variation thereof.

The second subpixel electrode 191b is formed to enclose the first subpixel electrode 191a.

A plurality of first branch electrodes 192a are formed at an edge of the first subpixel electrode 191a. The plurality of first branch electrodes 192a extend from a first plate-shaped portion 193a having a rhombus shape. The plate shape refers to a shape, which is not, split but is formed as a whole plate.

That is, the first subpixel electrode 191a includes the first plate-shaped portion 193a disposed at the center and a plurality of first branch electrodes 192a, which surround the first plate-shaped portion 193a and extend from the first plate-shaped portion 193a.

The central portion of the first plate-shaped portion 193a of the first subpixel electrode 191a overlaps with a central portion of a cross-shaped cutout 271 formed at a common electrode 270 to be described below in more detail.

The first branch electrodes 192a of the first subpixel electrode 191a extend in different directions. In more detail, the first branch electrodes 192a include a plurality of first minute branches 194a that obliquely extend in an upper left direction from the first plate-shaped portion 193a, a plurality of second minute branches 194b that obliquely extend in an upper right direction, a plurality of third minute branches 194c that obliquely extend in a lower left direction, and a plurality of fourth minute branches 194d that obliquely extend in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extending from the second plate-shaped portion 193b.

The second plate-shaped portion 193b of the second subpixel electrode 191b has a planar shape formed by combining four parallelograms, which are disposed outside of the first to fourth minute branches 194a, 194b, 194c, and 194d of the first subpixel electrode 191a. Similar to the first branch electrodes 192a of the first subpixel electrode 191a, the plurality of second branch electrodes 192b of the second subpixel electrode 191b include a plurality of fifth minute branches 194e that obliquely extend in an upper left direction from the second plate-shaped portion 193b, a plurality of sixth minute branches 194f that obliquely extend in an upper right direction, a plurality of seventh minute branches 194g that obliquely extend in a lower left direction, and a plurality of eighth minute branches 194h that obliquely extend in a lower right direction.

The first to fourth minute branches 194a, 194b, 194c, and 194d and the fifth to eighth minute branches 194e, 196f, 194g, and 194h form an angle of about 45° to about 135° with the gate line 121. Further, two of the minute branches 194a, 194b, 194c, 194d, 194e, 196f, 194g, and 194h, which extend in different directions and are adjacent to each other, may be substantially orthogonal to each other.

There is no gap (e.g., interval) between the first subpixel electrode 191a and the second subpixel electrode 191b. In more detail, when viewing the liquid crystal display at an upper side, the edges of the portion close to the second subpixel electrode 191b among the outer edges of the first branch electrodes and the edges of the portion close to the first subpixel electrode 191a among the edges of the second plate-shaped portion overlap each other.

The first passivation layer 180a, the overcoat 80, and the second passivation layer 180a have a first contact opening (e.g., hole) 185a exposing a portion of the first drain electrode 175a, and the first passivation layer 180a and the overcoat 80 have a second contact opening (e.g., hole) 185b exposing a portion of the second drain electrode 175b.

A first extension 195a of the first subpixel electrode 191a is physically and electrically coupled to (e.g., electrically connected to) the first drain electrode 175a through the first contact opening (e.g., hole) 185a, and a second extension 195b of the second subpixel electrode 191b is physically and electrically coupled to (e.g., electrically connected to) the second drain electrode 175b through the second contact opening (e.g., hole) 185b.

The first subpixel electrode 191a and the second subpixel electrode 191b receive data voltages from the first drain electrode 175a and the second drain electrode 175b through the first contact opening (e.g., hole) 185a and the second contact opening (e.g., hole) 185b, respectively.

Next, the upper panel 200 will be described.

The light blocking member 220 and the common electrode 270 are formed on a second insulation substrate 210.

The common electrode 270 has a plurality of cross-shaped cutouts 271. The cross-shaped cutouts 271 of the common electrode 270 are disposed for each basic region of the field generating electrode one by one, and may be coupled to (e.g., connected to) each other.

In the illustrated example embodiment, it is described that the light blocking member 220 is formed on the upper panel 200, but in the case of a liquid crystal display according to another example embodiment of the present invention, the light blocking member 220 may be disposed on the lower panel 100, and according to a further example embodiment of the present invention, the color filter may be disposed on the upper panel 200.

Alignment layers are formed on inner surfaces of the display panels 100 and 200, and may be vertical alignment layers.

Polarizers are provided on outer surfaces of the two panels 100 and 200, transmissive axes of the two polarizers are substantially orthogonal to each other, and one transmissive axis thereof may be substantially parallel to (e.g., parallel to) the gate line 121. However, the polarizer may be disposed only on the outer side of any one of the two panels 100 and 200.

The liquid crystal layer 3 has negative dielectric anisotropy, and liquid crystal molecules of the liquid crystal layer 3 are aligned so that long axes thereof are substantially perpendicular to (or normal to) the surfaces of the two panels 100 and 200 while the electric field is not applied. Accordingly, incident light does not pass through an orthogonal polarizer, and is substantially blocked while the electric field is not applied.

The first subpixel electrode 191a and the second subpixel electrode 191b, to which the data voltages are applied, generate the electric field together with the common electrode 270 of the upper panel 200, and as a result, the liquid crystal molecules of the liquid crystal layer 3 (which are aligned so as to be substantially perpendicular to (or normal to) the surfaces of the two electrodes 191 and 270 while the electric field is not applied) are tilted in a direction substantially parallel to the surfaces of the two electrodes 191 and 270, and luminance of light passing through the liquid crystal layer 3 varies according to the tilted degree of the liquid crystal molecules.

As described above, the first source electrode 173a and the second source electrode 173b are coupled to (e.g., connected to) the data line 171. Accordingly, the first subpixel electrode 191a and the second subpixel electrode 191b are applied with the data voltage of substantially the same (e.g., the same) magnitude from the data line 171.

In this case, the first subpixel electrode 191a is disposed on the second passivation layer 180b; however, the second subpixel electrode 191b is disposed under the second passivation layer 180b.

Accordingly, a first gap (e.g., a first interval) C1 between the first subpixel electrode 191a and the common electrode 270 is narrower than a second gap (e.g., a second interval) C2 between the second subpixel electrode 191b and the common electrode 270.

Therefore, intensity of an electric field generated between the first subpixel electrode 191a and the common electrode 270 is larger than the intensity of the electric field generated between the second subpixel electrode 191b and the common electrode 270. Also, a difference between the intensity of an electric field generated between the first subpixel electrode 191a and the common electrode 270 and the intensity of the electric field generated between the second subpixel electrode 191b and the common electrode 270 may be controlled according to a dielectric ratio of the second passivation layer 180b.

Accordingly, charging voltages of a first liquid crystal capacitor formed between the first subpixel electrode 191a and the common electrode 270 and a second liquid crystal capacitor formed between the second subpixel electrode 191b and the common electrode 270 represent different gamma curves, and a gamma curve of one pixel voltage becomes a combined curve of the gamma curves. A combined gamma curve at the front coincides with a reference gamma curve at the front, which is determined (e.g., most appropriately determined), and a combined gamma curve at the side approaches (e.g., becomes closest to or matches) the reference gamma curve at the front. As such, side visibility is improved by converting image data.

Next, a basic region of a field generating electrode of the liquid crystal display according to the example embodiment of the present invention will be described in more detail with reference to FIG. 3. FIG. 3 is a plan view illustrating a basic region of a field generating electrode of the liquid crystal display according to another example embodiment of the present invention.

As illustrated in FIG. 3, the basic electrode 199 of a field generating electrode of the liquid crystal display according to the example embodiment is configured by the cutout 271 of the common electrode 270 and the pixel electrode 191 including the first subpixel electrode 191a and the second subpixel electrode 191b, which face each other. The second subpixel electrode 191b is formed to surround the first subpixel electrode 191a.

There is no gap (e.g., interval) between the first subpixel electrode 191a and the second subpixel electrode 191b. In more detail, when viewing the liquid crystal display at an upper side, the edges of the portion close to the second subpixel electrode 191b among the outer edges of the first branch electrodes 192a and the edges of the portion close to the first subpixel electrode 191a among the edges of the second plate-shaped portion 193b overlap each other.

The cutout 271 of the common electrode 270 may have a cross shape when viewed from above.

A plurality of first branch electrodes 192a are formed at an edge of the first subpixel electrode 191a. The plurality of first branch electrodes 192a extend from the first plate-shaped portion 193a having a rhombus shape. That is, the first subpixel electrode 191a includes the first plate-shaped portion 193a disposed at the center and the plurality of first branch electrodes 192a surrounding the first plate-shaped portion 193a and extending from the first plate-shaped portion 193a.

A central portion of the first plate-shaped portion 193a of the first subpixel electrode 191a overlaps with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a that obliquely extend in an upper left direction from the first plate-shaped portion 193a, a plurality of second minute branches 194b that obliquely extend in an upper right direction, a plurality of third minute branches 194c that obliquely extend in a lower left direction, and a plurality of fourth minute branches 194d that obliquely extend in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extending from the second plate-shaped portion 193b.

The second plate-shaped portion 193b of the second subpixel electrode 191b has a planar shape formed by combining four parallelograms, which are disposed outside of the first to fourth minute branches 194a, 194b, 194c, and 194d of the first subpixel electrode 191a. Similar to the first branch electrodes 192a of the first subpixel electrode 191a, the plurality of second branch electrodes 192b of the second subpixel electrode 191b include a plurality of fifth minute branches 194e that obliquely extend in an upper left direction from the second plate-shaped portion 193b, a plurality of sixth minute branches 194f that obliquely extend in an upper right direction, a plurality of seventh minute branches 194g that obliquely extend in a lower left direction, and a plurality of eighth minute branches 194h that obliquely extend in a lower right direction.

The first to fourth minute branches 194a, 194b, 194c, and 194d and the fifth to eighth minute branches 194e, 196f, 194g, and 194h form an angle of about 45° or about 135° with a first direction D1. Further, two of the minute branches 194a, 194b, 194c, 194d, 194e, 196f, 194g, and 194h, which extend in different directions and are adjacent to each other, may be substantially orthogonal to each other.

The liquid crystal display according to the example embodiment of the present invention may include two to four basic electrodes 199 illustrated in FIG. 3 in one pixel area.

Figure 4:
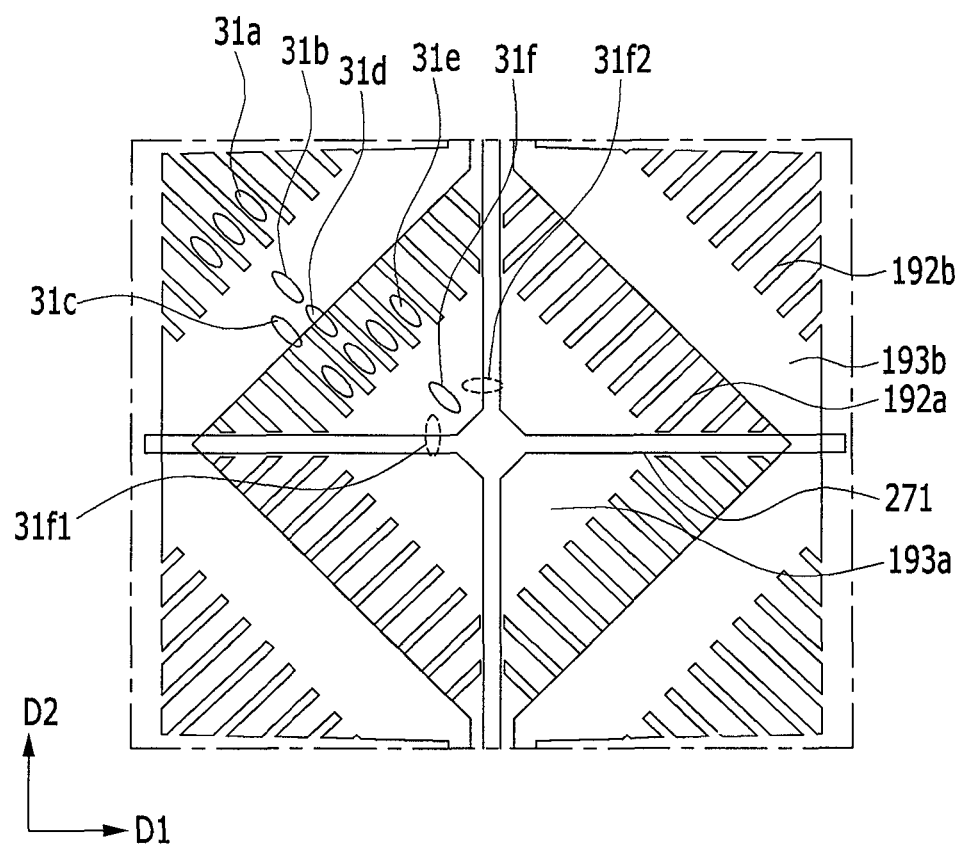
FIG. 4 is a schematic view illustrating alignment directions of directors of the liquid crystal molecules of the liquid crystal display according to the example embodiment of the present invention.

Next, alignment of the liquid crystal molecules in the basic region of the field generating electrode of the liquid crystal display, according to the example embodiment of the present invention, will be described with reference to FIGS. 4 and 5. FIG. 4 is a schematic view illustrating alignment directions of directors of the liquid crystal molecules of the liquid crystal display according to the example embodiment of the present invention, and FIG. 5 is a cross-sectional view illustrating alignment directions of directors of the liquid crystal molecules of the liquid crystal display according to the example embodiment of the present invention.

Figure 5:
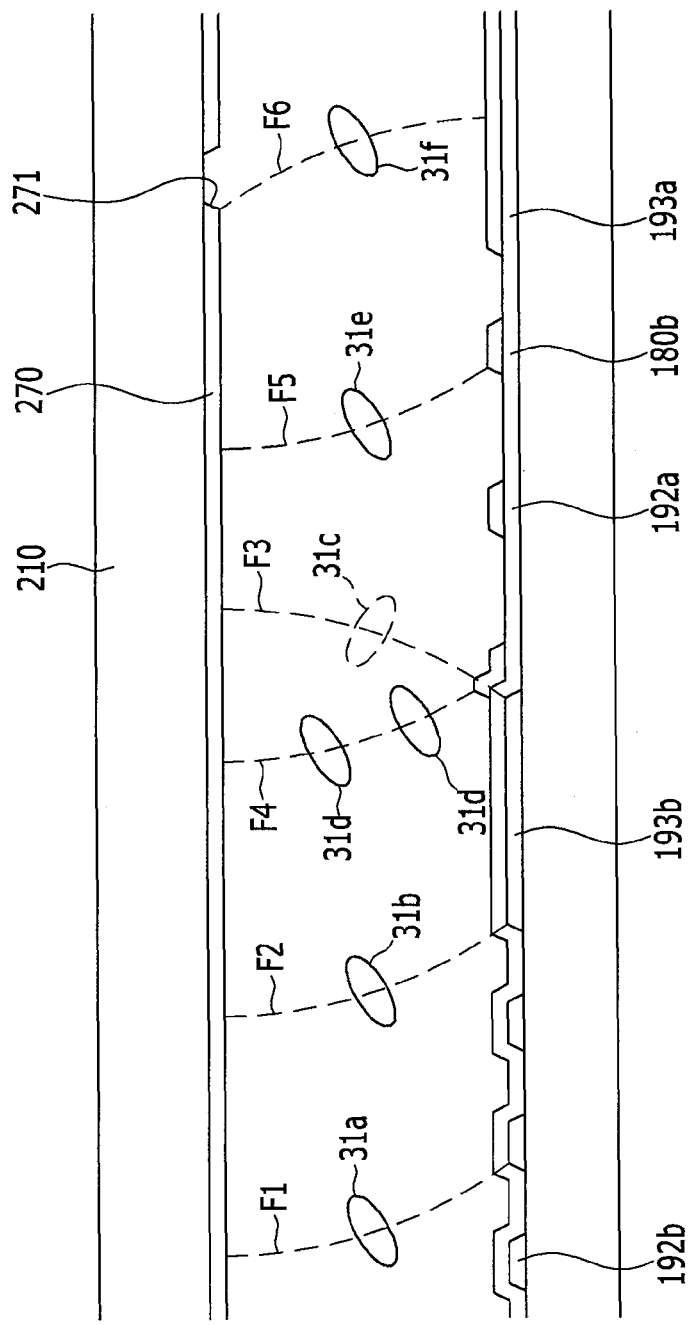
FIG. 5 is a cross-sectional view illustrating alignment directions of directors of the liquid crystal molecules of the liquid crystal display according to the example embodiment of the present invention.

Referring to FIGS. 4 and 5, a first fringe field F1 is generated in a direction, which is substantially perpendicular to (or normal to) an edge of the second branch electrode 192b of the second subpixel electrode 191b, and as a result, the first liquid crystal molecules 31a disposed around the second branch electrode 192b are tilted substantially in parallel with the direction of the first fringe field F1 and then collide with each other and tilt in a direction substantially parallel with a longitudinal direction in which the second branch electrode 192b extends.

Second liquid crystal molecules 31b disposed at a first edge adjacent to the second branch electrode 192b among edges of the second plate-shaped portion 193b of the second subpixel electrode 191b are influenced by a second fringe field F2 generated at the first edge of the second plate-shaped portion 193b. Accordingly, the second liquid crystal molecules 31b are tilt in a direction that is substantially perpendicular to (or normal to) the first edge of the second plate-shaped portion 193b, and is substantially the same as the tilted directions of the first liquid crystal molecules 31a.

A third fringe field F3 is generated at a second edge adjacent to the first subpixel electrode 191a among the edges of the second plate-shaped portion 193b, and a first portion 31c1 of third liquid crystal molecules 31c adjacent to the second edge, which is adjacent to the first subpixel electrode 191a, among the edges of the second plate-shaped portion 193b, is influenced by the third fringe field F3. Accordingly, the third liquid crystal molecules 31c are tilted in a direction that is substantially perpendicular to (or normal to) the second edge of the second plate-shaped portion 193b. The direction is opposite to (e.g., normal or perpendicular to) the directions in which the first liquid crystal molecules 31a and the second liquid crystal molecules 31b are tilted.

Further, a fourth fringe field F4 is generated at a third edge adjacent to the second plate-shaped portion 193b of the second subpixel electrode 191b among the edges of the first branch electrode 192a a, and fourth liquid crystal molecules 31d adjacent to the third edge of the first branch electrode 192a are tilted in a direction substantially perpendicular to (or normal to) the fourth fringe field F4. The direction is substantially parallel to the directions in which the first liquid crystal molecules 31a and the second liquid crystal molecules 31b are tilted.

As described above, the intensity of the electric field formed between the first subpixel electrode 191a and the common electrode 270 is larger than the intensity of the electric field formed between the second subpixel electrode 191b and the common electrode 270. Therefore, the magnitude of the fourth fringe field F4 is larger than the magnitude of the third fringe field F3.

Furthermore, according to the present example embodiment, the edge of the first branch electrode 192a of the first subpixel electrode 191a overlaps the edge of the second plate-shaped portion 193b of the second subpixel electrode 191b.

Therefore, the liquid crystal molecules disposed at the boundary portion of the edge of the first branch electrode 192a and the edge of the second plate-shaped portion 193b are influenced by the fourth fringe field F4 having a larger magnitude than the third fringe field F3, among the third fringe field F3 and the fourth fringe field F4 that are formed at the overlapping position. As a result, the third liquid crystal molecules 31c disposed at the boundary portion of the first subpixel electrode 191a and the second subpixel electrode 191b are tilted in the direction substantially parallel with the second liquid crystal molecules 31b and the fourth liquid crystal molecules 31d therearound, and, accordingly, the luminance of the liquid crystal display may be increased.

In the case where the tilted directions of the liquid crystal molecules disposed on the boundary of the first subpixel electrode 191a and the second subpixel electrode 191b are different from the tilted directions of the liquid crystal molecules disposed to correspond to the first subpixel electrode 191a and the second subpixel electrode 191b, the boundary of the first subpixel electrode 191a and the second subpixel electrode 191b appears darker than the first subpixel electrode 191a and the second subpixel electrode 191b, and as a result, the entire luminance of the liquid crystal display is reduced.

Fifth liquid crystal molecules 31e corresponding to the first branch electrode 192a of the first subpixel electrode 191a are influenced by a fifth fringe field F5 generated at the edge of the first branch electrode 192a and tilt in a direction substantially parallel with the fifth fringe field F5, and then collide with each other and tilt in the direction substantially parallel with the longitudinal direction in which the first branch electrode 192a extends.

Further, a third portion 31f1 and a fourth portion 31f2 of sixth liquid crystal molecules 31f corresponding to the first plate-shaped portion 193a are primarily tilted in a direction, which is substantially perpendicular to (or normal to) the edge of the cutout 271, by the sixth fringe field F6, which is applied to the cross-shaped cutout 271 formed at the common electrode 270. Said third portion 31f1 and fourth portion 31f2 of sixth liquid crystal molecules 31f then secondarily align in a direction such that the deformation is reduced (e.g., minimized) when the third portion 31f1 and the fourth portion 31f2 of the sixth liquid crystal molecules 31f meet each other. The secondarily aligned direction refers a vector sum direction of the directions in which the third portion 31f1 and the fourth portion 31f2 head (e.g., are oriented). Accordingly, the third portion 31f1 and the fourth portion 31f2 are tilted in a direction substantially parallel with the longitudinal direction in which the first branch electrode 192a extends.

As such, according to the example embodiment of the present invention, the first subpixel electrode 191a, to which a relatively high voltage is applied, is formed at the center to overlap with the center of the cross-shaped cutout 271 of the common electrode 270, and the plurality of first branch electrode 192a are formed at the edge of the first subpixel electrode 191a. Further, the second subpixel electrode 191b, to which a relatively low voltage is applied, is disposed at the edge of the first subpixel electrode 191a, and the plurality of second branch electrodes 192b are formed at the edge of the second subpixel electrode 191b. In addition, by overlapping the edge of the first branch electrode 192a of the first subpixel electrode 191a and the edge of the second plate-shaped portion 193b, the liquid crystal molecules disposed on the boundary of the first subpixel electrode 191a and the second subpixel electrode 191b are tilted substantially in parallel and in substantially the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a and the second branch electrode 192b of the first subpixel electrode 191a and the second subpixel electrode 191b have the plurality of minute branches 194a, 194b, 194c, 194d, 194e, 196f, 194g, and 194h, which extend in different directions, and as a result, the liquid crystal molecules are tilted in different directions. Accordingly, a viewing angle of the liquid crystal display is increased.

Next, a first experimental example of the present invention will be described with reference to FIG. 6 and FIG. 7

Figure 6:
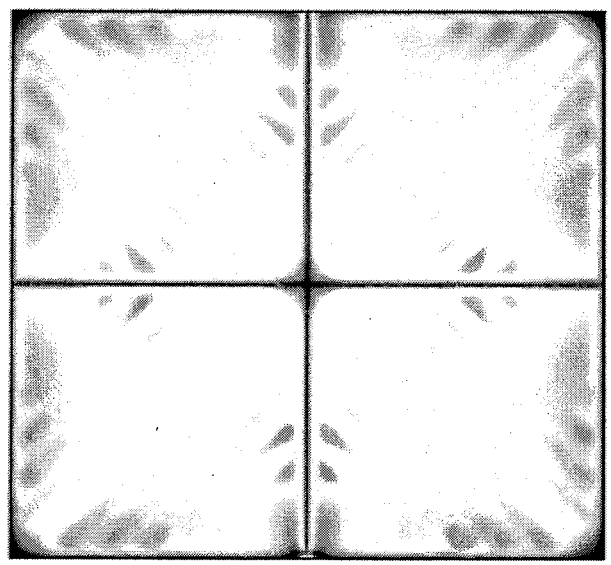
FIG. 6 and FIG. 7 are electron micrographs illustrating a result of a first experimental example of the present invention.
Figure 6:
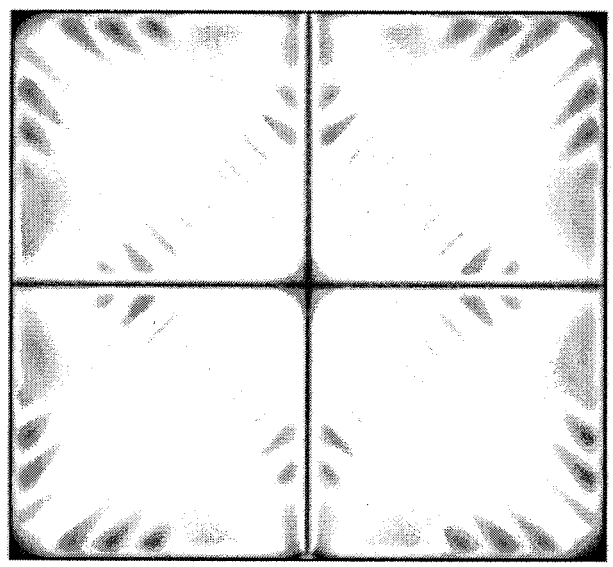
Figure 7:
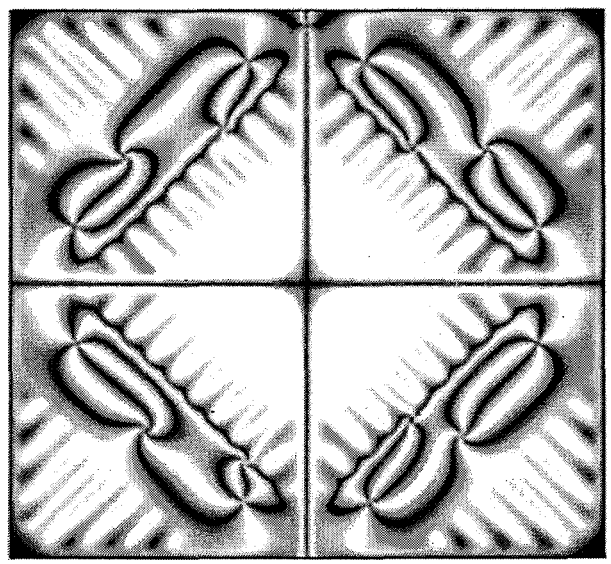
Figure 7:
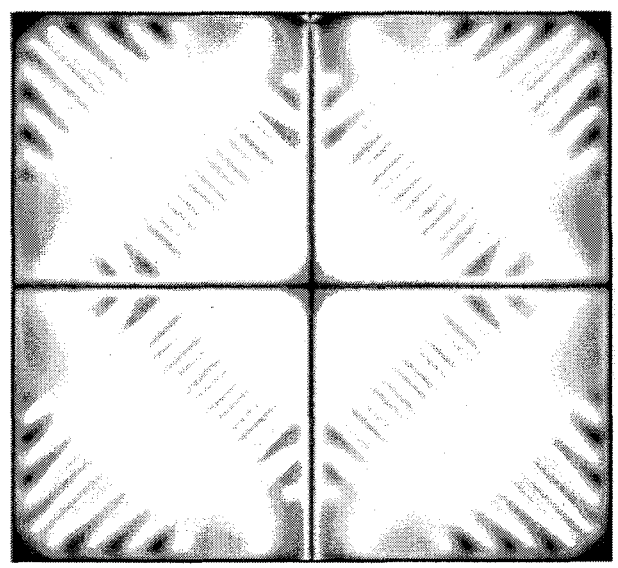

FIG. 6 and FIG. 7 are electron micrographs illustrating a result of a first experimental example of the present invention.

In the present experimental example, luminance of the liquid crystal display is measured by an electron microscope and is shown in FIG. 6. In FIG. 6, the result of a first case is represented by (a), and the result of a second case is represented by (b). In the first case, the thickness of the second passivation layer 180b disposed between the first subpixel electrode 191a and the second subpixel electrode 191b is about 0.624 μm, and a ratio of the voltage applied to the second subpixel electrode 191b to the voltage applied to the first subpixel electrode 191a is about 0.83. In the second case, the thickness of the second passivation layer 180b disposed between the first subpixel electrode 191a and the second subpixel electrode 191b is about 1.127 μm, and a ratio of the voltage applied to the second subpixel electrode 191b to the voltage applied to the first subpixel electrode 191a is about 0.75.

Similarly, while first subpixel electrode 191a and the second subpixel electrode 191b are formed to be separated by a gap or an interval (e.g., a predetermined interval), in a third case in which the ratio of the voltage applied to the second subpixel electrode 191b to the voltage applied to the first subpixel electrode 191a is about 0.83, and in a fourth case in which the ratio of the voltage applied to the second subpixel electrode 191b to the voltage applied to the first subpixel electrode 191a is about 0.75, the luminance of the liquid crystal display is measured by the electron microscope and is shown in FIG. 7.

In FIG. 7, the result of the third case is represented by (a), and the result of the fourth case is represented by (b).

Referring to FIG. 6 and FIG. 7, similar to the liquid crystal display according to the present example embodiment, the first subpixel electrode 191a and the second subpixel electrode 191b are not separated on the plane. When the edge of the subpixel electrode 191a and the edge of the second subpixel electrode 191b overlap each other, compared with the case in which the first subpixel electrode 191a and the second subpixel electrode 191b are separated from each other, it may be confirmed that the direction of the liquid crystal molecules may be controlled at the boundary portion of the first subpixel electrode 191a and the second subpixel electrode 191b.

Figure 8:
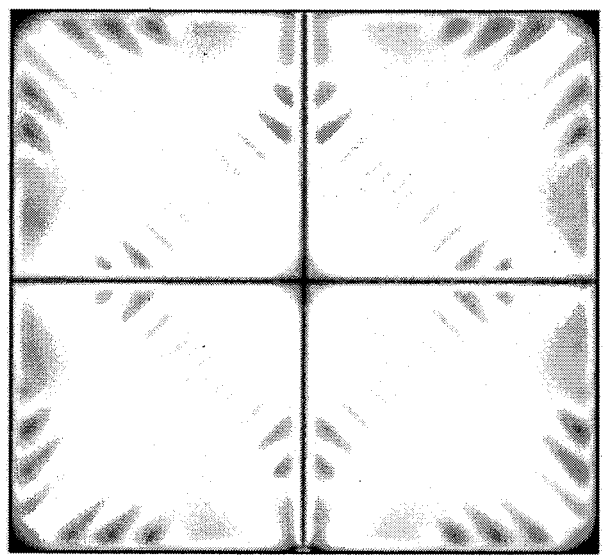
FIG. 8 and FIG. 9 are electron micrographs illustrating a result of a second experimental example of the present invention.
Figure 8:
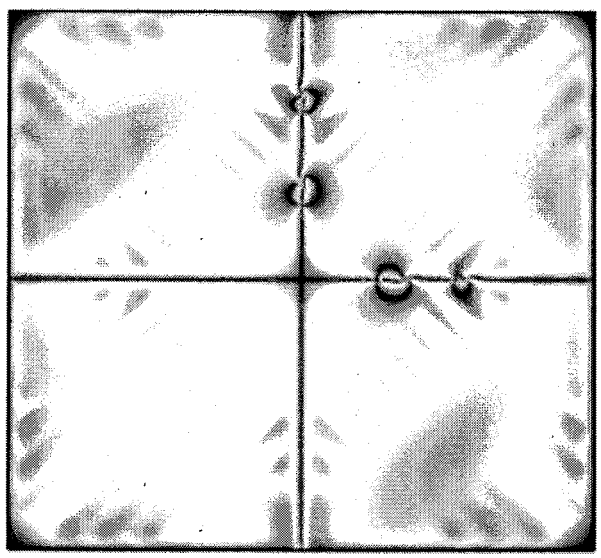
Figure 9:
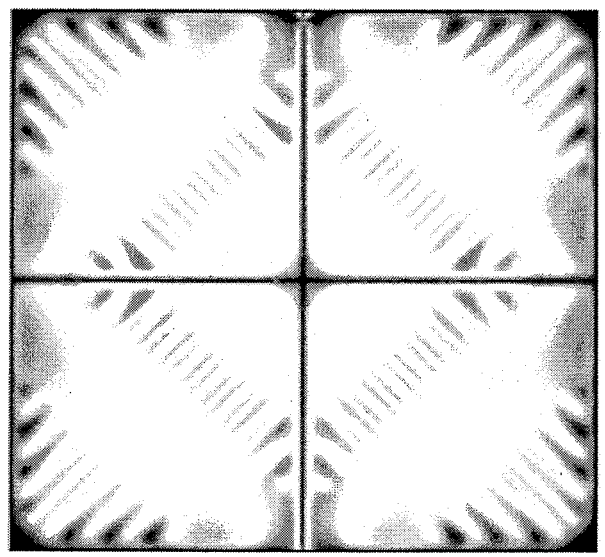
Figure 9:
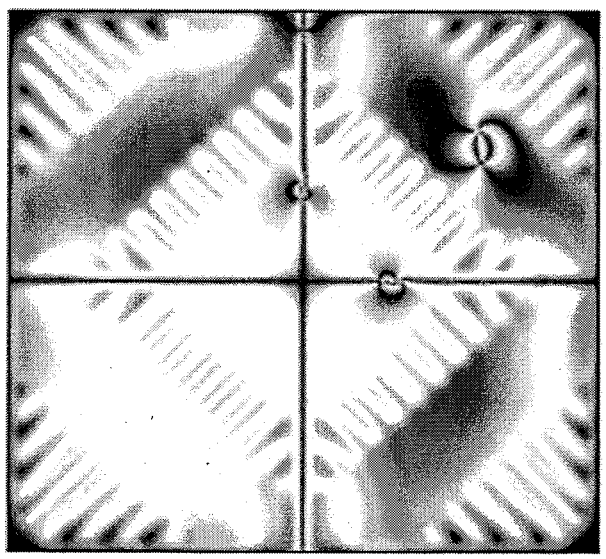

Next, a second experimental example of the present invention will be described with reference to FIG. 8 and FIG. 9. FIG. 8 and FIG. 9 are electron micrographs illustrating a result of the second experimental example of the present invention.

In the present experimental example, after a pressure is applied outside the liquid crystal display, the luminance of the liquid crystal display is measured by the electron microscope after a time (e.g., a predetermined time) and is shown in FIG. 8. In FIG. 8, the result of a first case is represented by (a), and the result of a second case is represented by (b). In the first case, the thickness of the second passivation layer 180b disposed between the first subpixel electrode 191a and the second subpixel electrode 191b is about 0.624 µm, and a ratio of the voltage applied to the second subpixel electrode 191b to the voltage applied to the first subpixel electrode 191a is about 0.83. In the second case, the thickness of the second passivation layer 180b disposed between the first subpixel electrode 191a and the second subpixel electrode 191b is about 1.127 µm, and a ratio of the voltage applied to the second subpixel electrode 191b to the voltage applied to the first subpixel electrode 191a is about 0.75, Similarly, while the first subpixel electrode 191a and the second subpixel electrode 191b are formed to be separated by a gap or an interval (e.g., a predetermined interval), in a third case in which the ratio of the voltage applied to the second subpixel electrode 191b to the voltage applied to the first subpixel electrode 191a is about 0.83, and in a fourth case in which the ratio of the voltage applied to the second subpixel electrode 191b to the voltage applied to the first subpixel electrode 191a is about 0.75, after the pressure is applied outside the liquid crystal display, the luminance of the liquid crystal display is measured by the electron microscope after the time (e.g., the predetermined time) and is shown in FIG. 9. In FIG. 9, the result of the third case is represented by (a), and the result of the fourth case is represented by (b).

Referring to FIG. 8 and FIG. 9, similar to the liquid crystal display according to the present example embodiment, the first subpixel electrode 191a and the second subpixel electrode 191b are not separated on the plane. When the edge of the subpixel electrode 191a and the edge of the second subpixel electrode 191b overlap each other, compared with the case in which the first subpixel electrode 191a and the second subpixel electrode 191b are separated from each other, it may be confirmed that the direction of the liquid crystal molecules may be controlled at the boundary portion of the first subpixel electrode 191a and the second subpixel electrode 191b. That is, similar to the liquid crystal display according to the present example embodiment, the first subpixel electrode 191a are the second subpixel electrode 191b are not separated, and when the edge of the first subpixel electrode 191a and the edge of the second subpixel electrode 191b overlap each other, although the movement of the liquid crystal molecule is irregular by an external pressure, the liquid crystal molecules may be restored into the original position.

Figure 10:
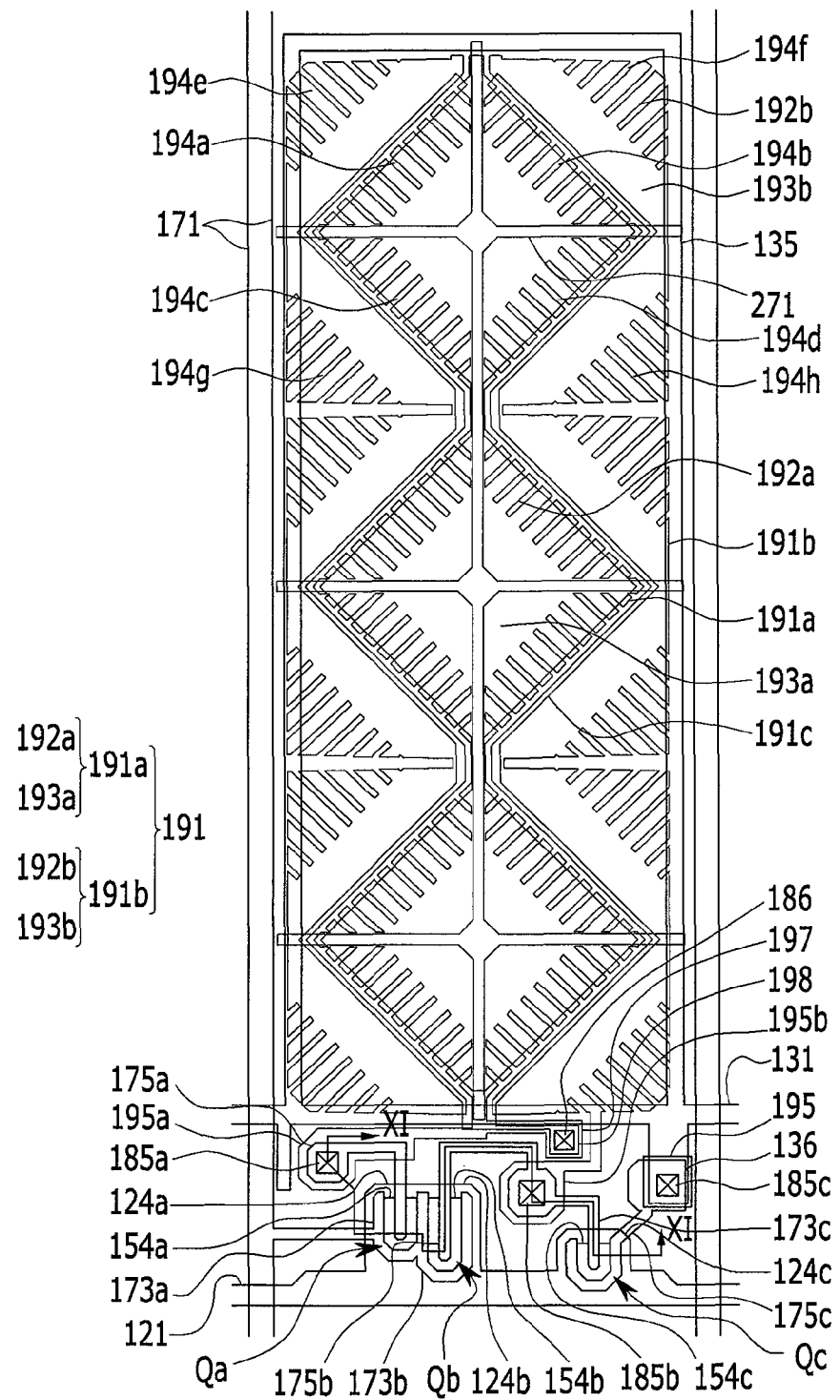
FIG. 10 is a layout view of a liquid crystal display according to another example embodiment of the present invention.

Next, referring to FIG. 10 and FIG. 11, the liquid crystal display according to another example embodiment of the present invention will be described. FIG. 10 is a layout view of a liquid crystal display according to the other example embodiment of the present invention, and FIG. 11 is a cross-sectional view of the liquid crystal display of FIG. 10 taken along the line XI-XI.

Figure 11:
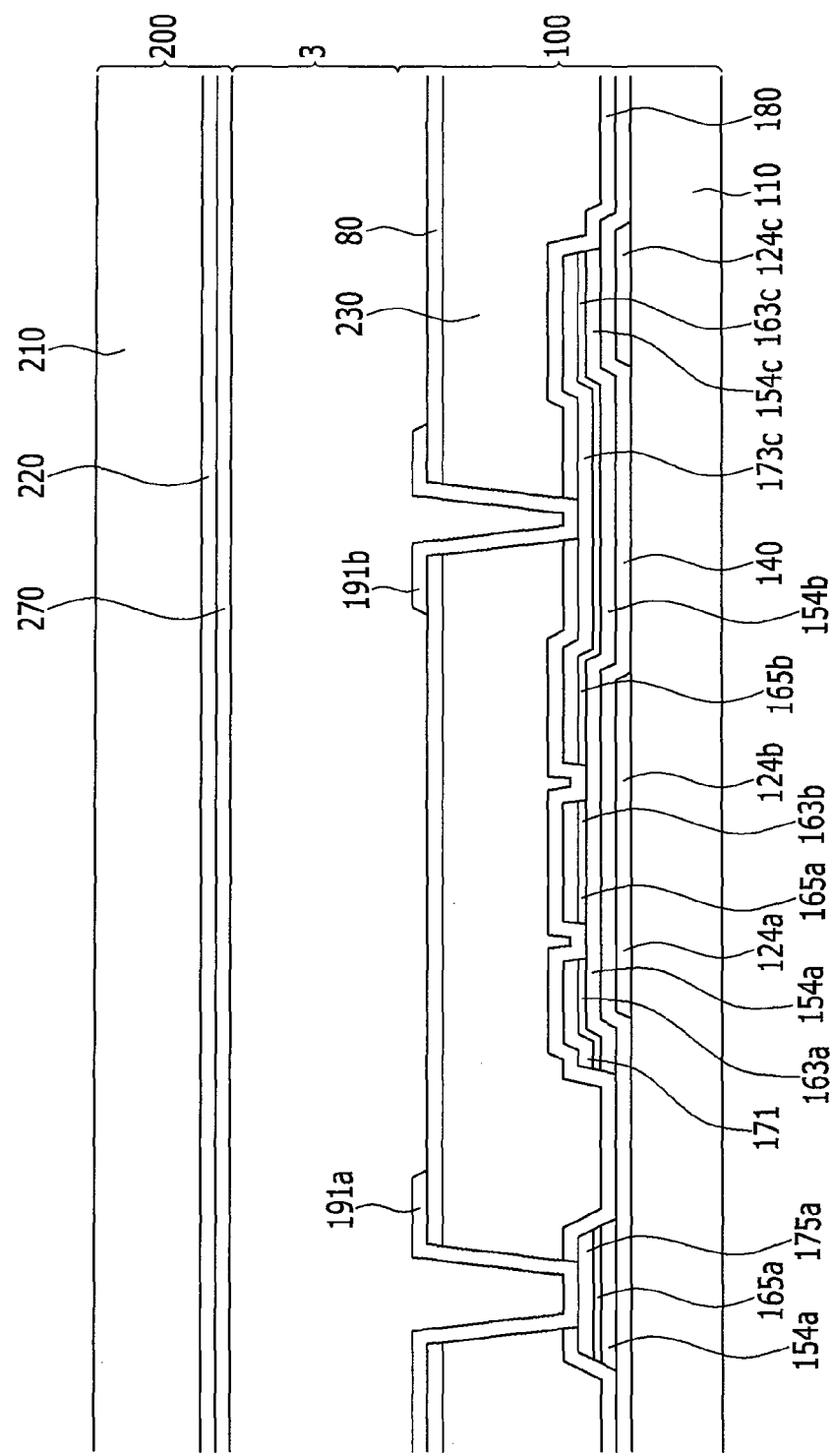
FIG. 11 is a cross-sectional view of the liquid crystal display of FIG. 10 taken along the line XI-XI.

Referring to FIG. 10 and FIG. 11, the liquid crystal display according to the example embodiment includes a lower panel 100 and an upper panel 200 facing each other, a liquid crystal layer 3 interposed between the two panels 100 and 200, and a pair of polarizers attached to outer sides of the panels 100 and 200.

First, the lower panel 100 will be described.

A gate line 121, a reference voltage line 131, and a storage electrode 135 are formed on a first substrate 110. The gate line 121 mainly extends in a horizontal direction and transfers a gate signal.

The gate line 121 includes a first gate electrode 124a, a second gate electrode 124b, a third gate electrode 124c, and a wide end portion for coupling with (e.g., connection with) another layer or an external driving circuit.

The reference voltage line 131 may extend substantially in parallel (e.g., extend in parallel) with the gate line 121 and has an expansion 136, and the expansion 136 is coupled with (e.g., connected with) a third drain electrode 175c to be described below in more detail.

The reference voltage line 131 includes the storage electrode 135 surrounding a pixel area.

A gate insulating layer 140 is formed on the gate line 121, the reference voltage line 131, and the storage electrode 135.

A first semiconductor 154a, a second semiconductor 154b, and a third semiconductor 154c, which may be made of amorphous or crystalline silicon, are formed on the gate insulating layer 140.

A plurality of ohmic contacts 163a, 163b, 163c, 165a, 165b, and 165c are formed on the first semiconductor 154a, the second semiconductor 154b, and the third semiconductor 154c. In the case where the semiconductors 154a, 154b, and 154c are oxide semiconductors, the ohmic contacts may be omitted.

A data conductor including a data line 171 including a first source electrode 173a and a second source electrode 173b, a first drain electrode 175a, a second drain electrode 175b, a third source electrode 173c, and a third drain electrode 175c is formed on the ohmic contacts 163a, 165a, 163b, 165b, 163c, and 165c and the gate insulating layer 140.

The second drain electrode 175b is coupled with the third source electrode 173c.

The first gate electrode 124a, the first source electrode 173a, and the first drain electrode 175a form a first thin film transistor Qa together with a first semiconductor 154a, and a channel of the first thin film transistor is formed in the semiconductor portion 154a between the first source electrode 173a and the first drain electrode 175a. Similarly, the second gate electrode 124b, the second source electrode 173b, and the second drain electrode 175b form a second thin film transistor Qb together with the second semiconductor 154b, and a channel of the second thin film transistor is formed in the semiconductor portion 154b between the second source electrode 173b and the second drain electrode 175b. The third gate electrode 124c, the third source electrode 173c, and the third drain electrode 175c form a third thin film transistor Qc together with the third semiconductor island 154c, and a channel of the third thin film transistor is formed in the semiconductor portion 154c between the third source electrode 173c and the third drain electrode 175c.

A passivation layer 180 made of an inorganic insulating material, such as silicon nitride or silicon oxide, is formed on the data conductor 171, 173a, 173b, 173c, 175a, 175b, and 175c and the exposed portions of the semiconductors 154a, 154b, and 154c.

A color filter 230 is disposed on the passivation layer 180.

A light blocking member may be disposed on a region where the color filter 230 is not disposed and a part of the color filter 230. The light blocking member is called a black matrix and blocks light leakage.

A capping layer 80 is disposed on the color filter 230. The capping layer 80 may reduce (e.g., prevent) the color filter 230 from being lifted and suppress the contamination of the liquid crystal layer 3 due to an organic material, such as a solvent, flowing from the color filter 230, thereby reducing (e.g., preventing) defects, such as an afterimage, which may be caused when a screen is driven.

A third electrode 191c is formed on the capping layer 80.

A second passivation layer 180b is formed on the third electrode 191c.

A pixel electrode 191 (including a first subpixel electrode 191a and a second subpixel electrode 191b) is formed on the second passivation layer 180b. The first subpixel electrode 191a and the second subpixel electrode 191b include a basic electrode 199 illustrated in FIG. 12 or one or more modifications thereof.

The first subpixel electrode 191a and the second subpixel electrode 191b are spaced apart from each other by a distance (e.g., a predetermined distance).

The second subpixel electrode 191b is formed to surround the first subpixel electrode 191a.

A plurality of first branch electrodes 192a are formed at an edge of the first subpixel electrode 191a. The plurality of first branch electrodes 192a extend from a first plate-shaped portion 193a having a rhombus shape. The plate shape refers to a shape, which is not split but is formed as a whole plate.

That is, the first subpixel electrode 191a includes the first plate-shaped portion 193a disposed at the center and a plurality of first branch electrodes 192a, which surround the first plate-shaped portion 193a and extend from the first plate-shaped portion 193a.

The central portion of the first plate-shaped portion 193a of the first subpixel electrode 191a overlaps with a central portion of a cross-shaped cutout 271 formed at a common electrode 270 to be described below in more detail.

The first branch electrodes 192a of the first subpixel electrode 191a extend in different directions. In more detail, the first branch electrodes 192a include a plurality of first minute branches 194a that obliquely extend in an upper left direction from the first plate-shaped portion 193a, a plurality of second minute branches 194b that obliquely extend in an upper right direction, a plurality of third minute branches 194c that obliquely extend in a lower left direction, and a plurality of fourth minute branches 194d that obliquely extend in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extending from the second plate-shaped portion 193b.

The second plate-shaped portion 193b of the second subpixel electrode 191b has a planar shape formed by combining four parallelograms, which are disposed outside of the first to fourth minute branches 194a, 194b, 194c, and 194d of the first subpixel electrode 191a. Similar to the first branch electrodes 192a of the first subpixel electrode 191a, the plurality of second branch electrodes 192b of the second subpixel electrode 191b include a plurality of fifth minute branches 194e that obliquely extend in an upper left direction from the second plate-shaped portion 193b, a plurality of sixth minute branches 194f that obliquely extend in an upper right direction, a plurality of seventh minute branches 194g that obliquely extend in a lower left direction, and a plurality of eighth minute branches 194h that obliquely extend in a lower right direction.

The first to fourth minute branches 194a, 194b, 194c, and 194d, and the fifth to eighth minute branches 194e, 196f, 194g, and 194h form an angle of about 45° to about 135° with the gate line 121. Further, two of the minute branches 194a, 194b, 194c, 194d, 194e, 196f, 194g, and 194h, which extend in different direction and are adjacent to each other, may be substantially orthogonal to each other.

The third electrode 191c is formed at the separation of the first subpixel electrode 191a and the second subpixel electrode 191b. In the top view point on the liquid crystal display, the third electrode 191c is formed along the gap or interval (e.g., the predetermined interval) from which the first subpixel electrode 191a and the second subpixel electrode 191b are separated.

The first passivation layer 180a, the overcoat 80, and the second passivation layer 180b have the first contact opening (e.g., hole) 185a exposing the portion of the first drain electrode 175a and the second contact opening (e.g., hole) 185b exposing the portion of the second drain electrode 175b. The gate insulating layer 140, the first passivation layer 180a, the overcoat 80, and the second passivation layer 180b have a third contact opening (e.g., hole) 185c exposing a portion of the expansion 136 of the reference voltage line 131 and the third drain electrode 175c.

A first extension 195a of the first subpixel electrode 191a is physically and electrically coupled to the first drain electrode 175a through the first contact opening 185a, and a second extension 195b of the second subpixel electrode 191b is physically and electrically coupled to the second drain electrode 175b through the second contact opening 185b.

The second passivation layer 180b has a fourth contact opening (e.g., hole) 186 exposing a third expansion 198 of the third electrode 191c, and a fourth expansion 197 of the first subpixel electrode 191a is formed on/in the fourth contact opening 186.

The first subpixel electrode 191a and the second subpixel electrode 191b receive data voltages from the first drain electrode 175a and the second drain electrode 175b through the first contact opening 185a and the second contact opening 185b, respectively.

A connecting member 195 is formed on the expansion 136 of the reference voltage line 131 exposed through the third contact opening 185c and the third drain electrode 175c, and the third drain electrode 175c is physically and electrically coupled to the expansion 136 of the reference voltage line 131 through the connecting member 195.

Next, the upper panel 200 will be described.

A light blocking member 220 and a common electrode 270 are formed on a second insulation substrate 210.

The common electrode 270 has a plurality of cross-shaped cutouts 271. The cross-shaped cutouts 271 of the common electrode 270 are disposed for each basic region of the field generating electrode one by one, and may be coupled to each other.

In the illustrated example embodiment, it is described that the light blocking member 220 is formed on the upper panel 200; however, in the case of a liquid crystal display according to another example embodiment of the present invention, the light blocking member 220 may be disposed on the lower panel 100, and according to a further example embodiment of the present invention, the color filter may be disposed on the upper panel 200.

Alignment layers are formed on inner surfaces of the display panels 100 and 200, and may be vertical alignment layers.

Polarizers are provided on outer surfaces of the two panels 100 and 200, transmissive axes of the two polarizers are substantially orthogonal to each other, and one transmissive axis thereof may be substantially parallel to the gate line 121. However, the polarizer may be disposed only on the outer side of any one of the two panels 100 and 200.

The liquid crystal layer 3 has negative dielectric anisotropy, and the liquid crystal molecules of the liquid crystal layer 3 are aligned so that long axes thereof are substantially perpendicular to (or normal to) the surfaces of the two panels 100 and 200 while the electric field is not applied. Accordingly, incident light does not pass through an orthogonal polarizer, and is substantially blocked while the electric field is not applied.

The first subpixel electrode 191*a* and the second subpixel electrode 191*b*, to which the data voltages are applied, generate the electric field together with the common electrode 270 of the upper panel 200, and as a result, the liquid crystal molecules of the liquid crystal layer 3, which are aligned so as to be substantially perpendicular to (or normal to) the surfaces of the two electrodes 191 and 270, while the electric field is not applied are tilted in a direction substantially parallel to the surfaces of the two electrodes 191 and 270, and luminance of light passing through the liquid crystal layer 3 varies according to the tilted degree of the liquid crystal molecules.

Next, a driving method of the liquid crystal display according to the example embodiment will be briefly described.

When a gate-on signal is applied to the gate line 121, the gate-on signal is applied to the first gate electrode 124*a*, the second gate electrode 124*b*, and the third gate electrode 124*c*, and as a result, a first switching element Qa, a second switching element Qb, and a third switching element Qc are turned on. Accordingly, the data voltages applied to the data line 171 are applied to the first subpixel electrode 191*a* and the second subpixel electrode 191*b* through the turned-on first switching element Qa and second switching element Qb, respectively. In this case, the voltages having substantially the same magnitude are applied to the first subpixel electrode 191*a* and the second subpixel electrode 191*b*. However, the voltage applied to the second subpixel electrode 191*b* is divided through the third switching element Qc, which is coupled with the second switching element Qb in series. Accordingly, the voltage applied to the second subpixel electrode 191*b* is smaller than the voltage applied to the first subpixel electrode 191*a*.

As such, the magnitude of the second voltage applied to the second subpixel electrode 191*b* is smaller than the magnitude of the first voltage applied to the first subpixel electrode 191*a*. Accordingly, a difference in voltage between the first subpixel electrode 191*a* and the common electrode 270 is larger than a difference in voltage between the second subpixel electrode 191*b* and the common electrode 270.

Accordingly, charging voltages of a first liquid crystal capacitor formed between the first subpixel electrode 191*a* and the common electrode 270 and a second liquid crystal capacitor formed between the second subpixel electrode 191*b* and the common electrode 270 represent different gamma curves, and a gamma curve of one pixel voltage becomes a combined curve of the gamma curves. A combined gamma curve at the front coincides with a reference gamma curve at the front, which is determined (e.g., most appropriately determined), and a combined gamma curve at the side becomes closest to the reference gamma curve at the front. As such, side visibility is improved by converting image data.

Also, the first subpixel electrode 191*a* and the third electrode 191*c* are coupled to each other such that the voltage of substantially the same (e.g., the same) magnitude is applied to them.

According to an example embodiment of the present invention, the voltage applied to the second subpixel electrode 191*b* is divided through the third switching element Qc coupled in series to the second switching element Qb such that the voltage applied to the second subpixel electrode 191*b* is smaller than the voltage applied to the first subpixel electrode 191*a*; however, the present invention is not limited thereto, and several methods for differentiating the voltages applied to the first subpixel electrode 191*a* and the second subpixel electrode 191*b* may be applied.

Figure 12:
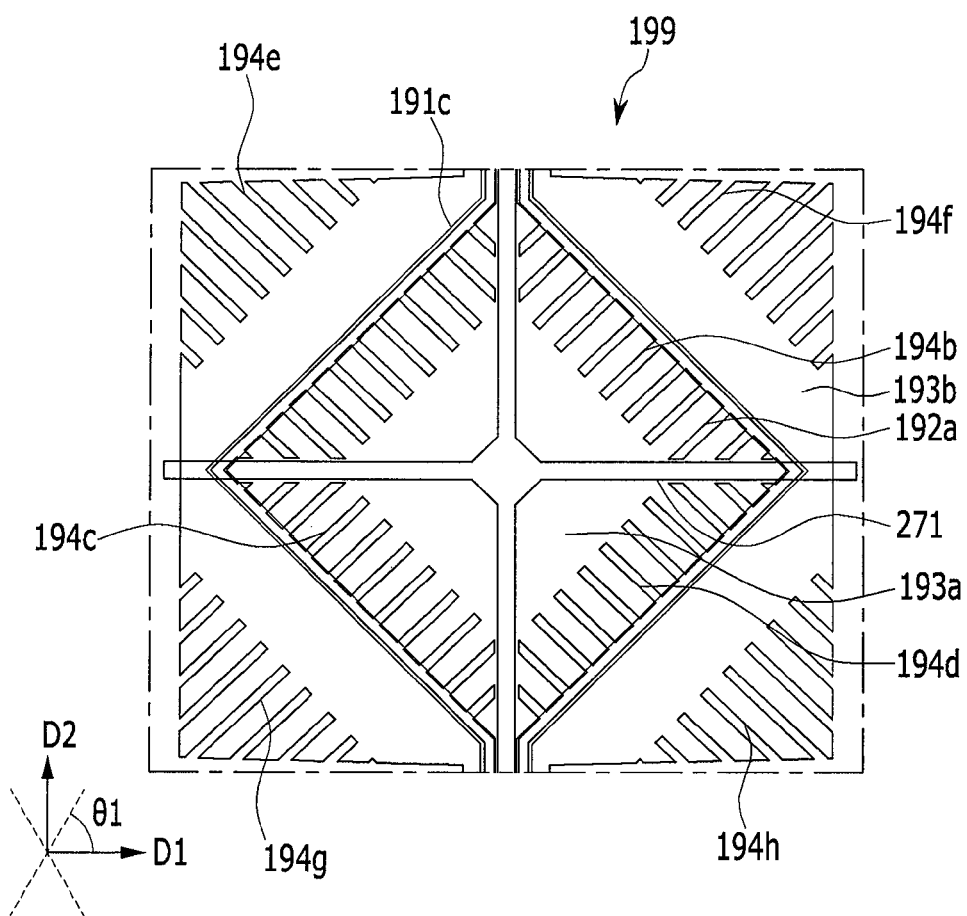
FIG. 12 is a plan view illustrating a basic region of a field generating electrode of a liquid crystal display according to another example embodiment of the present invention.

Next, a basic region of a field generating electrode of the liquid crystal display according to the example embodiment of the present invention will be described in more detail with reference to FIG. 12. FIG. 12 is a plan view illustrating a basic region of a field generating electrode of the liquid crystal display according to another example embodiment of the present invention.

As illustrated in FIG. 12, a basic electrode 199 of a field generating electrode is configured by a cutout 271 of the common electrode 270, and a pixel electrode 191 including a first subpixel electrode 191*a* and a second subpixel electrode 191*b* facing each other. The second subpixel electrode 191*b* is formed to surround the first subpixel electrode 191*a*.

The cutout 271 of the common electrode 270 may have a cross shape when viewed from above.

A plurality of first branch electrodes 192*a* are formed at an edge of the first subpixel electrode 191*a*. The plurality of first branch electrodes 192*a* extend from the first plate-shaped portion 193*a* having a rhombus shape. That is, the first subpixel electrode 191*a* includes the first plate-shaped portion 193*a* disposed at the center and the plurality of first branch electrode 192*a* surrounding the first plate-shaped portion 193*a* and extending from the first plate-shaped portion 193*a*.

A central portion of the first plate-shaped portion 193*a* of the first subpixel electrode 191*a* overlaps with a central portion of the cross-shaped cutout 271 formed at the common electrode 270.

The first branch electrodes 192*a* of the first subpixel electrode 191*a* extend in different directions. In more detail, the first branch electrodes 192*a* include a plurality of first minute branches 194*a* that obliquely extend in an upper left direction from the first plate-shaped portion 193*a*, a plurality of second minute branches 194*b* that obliquely extend in an upper right direction, a plurality of third minute branches 194*c* that obliquely extend in a lower left direction, and a plurality of fourth minute branches 194*d* that obliquely extend in a lower right direction.

The second subpixel electrode 191*b* includes a second plate-shaped portion 193*b* surrounding the plurality of first branch electrodes 192*a* of the first subpixel electrode 191*a*, and a plurality of second branch electrodes 192*b* surrounding the second plate-shaped portion 193*b* and extending from the second plate-shaped portion 193*b*.

The second plate-shaped portion 193*b* of the second subpixel electrode 191*b* has a planar shape formed by combining four parallelograms, which are disposed outside of the first to fourth minute branches 194*a*, 194*b*, 194*c*, and 194*d* of the first subpixel electrode 191*a*. Similar to the first branch electrodes 192*a* of the first subpixel electrode 191*a*, the plurality of second branch electrodes 192*b* of the second subpixel electrode 191*b* include a plurality of fifth minute branches 194*e* that obliquely extend in an upper left direction from the second plate-shaped portion 193*b*, a plurality of sixth minute branches 194*f* that obliquely extend in an upper right direction, a plurality of seventh minute branches 194*g* that obliquely extend in a lower left direction, and a plurality of eighth minute branches 194*h* that obliquely extend in a lower right direction.

The first to fourth minute branches 194*a*, 194*b*, 194*c*, and 194*d* and the fifth to eighth minute branches 194*e*, 196*f*, 194*g*, and 194*h* form an angle of about 45° or about 135° with a first direction D1. Further, two of the minute branches 194*a*, 194*b*, 194*c*, 194*d*, 194*e*, 196*f*, 194*g*, and 194*h*, which extend in different directions and are adjacent to each other, may be substantially orthogonal to each other.

Also, according to the present example embodiment, the third electrode 191*c* is formed along with the space between the first subpixel electrode 191*a* and the second subpixel electrode 191*b* separated by the gap or interval (e.g., the predetermined interval).

The liquid crystal display according to the example embodiment of the present invention may include two to four basic electrodes 199 illustrated in FIG. 12 in one pixel area.

Figure 13:
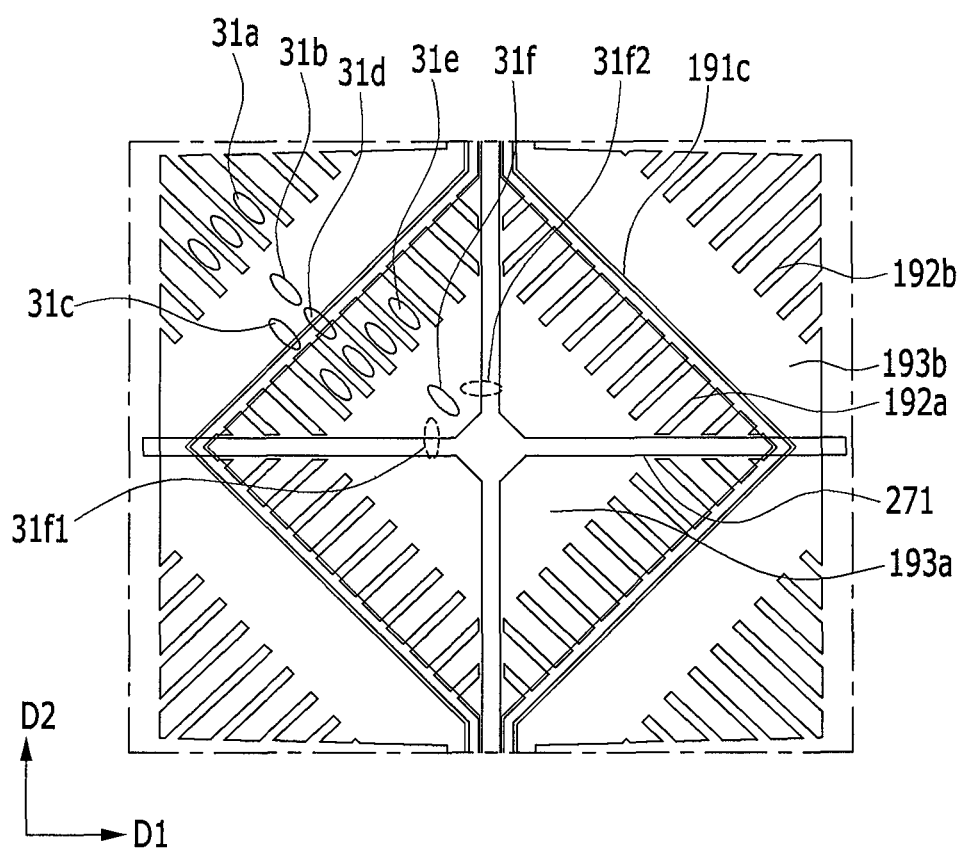
FIG. 13 is a schematic view illustrating alignment directions of directors of the liquid crystal molecules of the liquid crystal display according to the example embodiment of the present invention.
Figure 14:
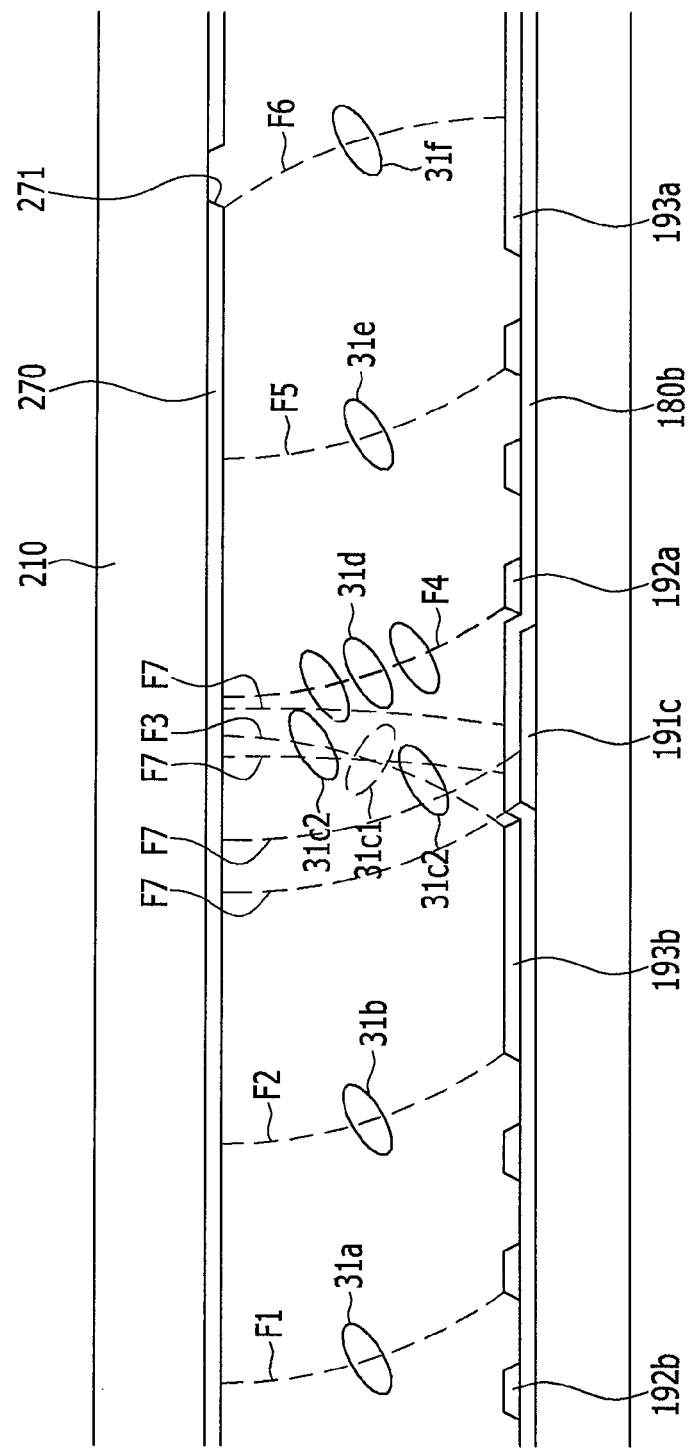
FIG. 14 is a cross-sectional view illustrating alignment directions of directors of the liquid crystal molecules of the liquid crystal display according to the example embodiment of the present invention.

Next, alignment of the liquid crystal molecules in the basic region of the field generating electrode of the liquid crystal display according to the example embodiment of the present invention will be described with reference to FIG. 13 and FIG. 14. FIG. 13 is a schematic view illustrating alignment directions of directors of the liquid crystal molecules of the liquid crystal display according to the example embodiment of the present invention. FIG. 14 is a cross-sectional view illustrating alignment directions of directors of the liquid crystal molecules of the liquid crystal display according to the example embodiment of the present invention.

Referring to FIG. 13 and FIG. 14, a first fringe field F1 is generated in a direction that is substantially perpendicular to (or normal to) an edge of the second branch electrode 192*b* of the second subpixel electrode 191*b*. As a result, the first liquid crystal molecules 31*a* disposed around the second branch electrode 192*b* are tilted substantially in parallel with the direction of the first fringe field F1 and then collide with each other and tilt in a direction substantially parallel with a longitudinal direction in which the second branch electrode 192*b* extends.

Second liquid crystal molecules 31*b* disposed at a first edge adjacent to the second branch electrode 192*b* among edges of the second plate-shaped portion 193*b* of the second subpixel electrode 191*b* are influenced by a second fringe field F2 generated at the first edge of the second plate-shaped portion 193*b*. Accordingly, the second liquid crystal molecules 31*b* are tilted in a direction that is substantially perpendicular to (or normal to) the first edge of the second plate-shaped portion 193*b*, and is substantially the same as the tilted directions of the first liquid crystal molecules 31*a*.

A third fringe field F3 is generated at a second edge adjacent to the first subpixel electrode 191*a* among the edges of the second plate-shaped portion, and a first portion 31*c*1 of third liquid crystal molecules 31*c* adjacent to the second edge, which is adjacent to the first subpixel electrode 191*a* among the edges of the second plate-shaped portion 193*b* is influenced by the third fringe field F3. Accordingly, the third liquid crystal molecules 31*c* are to be tilted in a direction that is substantially perpendicular to (or normal to) the second edge of the second plate-shaped portion 193*b*. The direction is opposite to (e.g., normal or perpendicular to) the directions in which the first liquid crystal molecules 31*a* and the second liquid crystal molecules 31*b* are tilted.

Further, a fourth fringe field F4 is generated at a third edge adjacent to the second plate-shaped portion 193*b* of the second subpixel electrode 191*b* among the edges of the first branch electrode 192*a*, and fourth liquid crystal molecules 31*d* adjacent to the third edge of the first branch electrode 192*a* are tilted in a direction substantially perpendicular to (or normal to) the fourth fringe field F4. The direction is substantially parallel to the directions in which the first liquid crystal molecules 31*a* and the second liquid crystal molecules 31*b* are tilted.

Also, the third electrode 191*c* is formed at the position overlapping the separation portion between the edge of the second plate-shaped portion 193*b* of the second subpixel electrode 191*b* and the edge of the first branch electrode 192*a* of the first subpixel electrode 191*a*. A seventh fringe field F7 is formed between the third electrode 191*c* and the common electrode 270.

As described above, a magnitude of the voltage applied to the first subpixel electrode 191*a* is larger than a magnitude of the voltage applied to the second subpixel electrode 191*b*, and the third electrode 191*c* is applied with the voltage having substantially the same magnitude as the first subpixel electrode 191*a*. Accordingly, the voltage difference between the first subpixel electrode 191*a* and the common electrode 270 is larger than the voltage difference between the second subpixel electrode 191*b* and the common electrode 270. Therefore, the magnitude of the fourth fringe field F4 is larger than the magnitude of the third fringe field F3. Therefore, a second portion 31*c*2 of the third liquid crystal molecules 31*c* adjacent to the second edge adjacent to the first subpixel electrode 191*a* is influenced by the fourth fringe field F4 and tilts in a direction substantially perpendicular to (or normal to) the fourth fringe field F4.

Furthermore, according to the present example embodiment, the liquid crystal molecules overlapping the separation of the first subpixel electrode 191*a* and the second subpixel electrode 191*b* are influenced together by the seventh fringe field F7 according to the third electrode 191*c*. Accordingly, the first portion 31*c*1 of the third liquid crystal molecules 31*c*, which are influenced by the third fringe field F3. Accordingly, the third liquid crystal molecules 31*c* are tilted in the direction substantially perpendicular to (or normal to) the third fringe field F3 is also influenced by the fourth fringe field F4 and the seventh fringe field F7.

Accordingly, the third liquid crystal molecules 31c disposed between the first subpixel electrode 191a and the second subpixel electrode 191b are tilted substantially in parallel to the second liquid crystal molecules 31b and the fourth liquid crystal molecules 31d, and accordingly, the luminance of the liquid crystal display may be increased. In the case where the tilted directions of the liquid crystal molecules disposed on the boundary of the first subpixel electrode 191a and the second subpixel electrode 191b are different from the tilted directions of the liquid crystal molecules disposed to correspond to the first subpixel electrode 191a and the second subpixel electrode 191b, the boundary of the first subpixel electrode 191a and the second subpixel electrode 191b appears darker than the first subpixel electrode 191a and the second subpixel electrode 191b, and as a result, the entire luminance of the liquid crystal display is reduced.

Fifth liquid crystal molecules 31e corresponding to the first branch electrode 192a of the first subpixel electrode 191a are influenced by a fifth fringe field F5 generated at the edge of the first branch electrode 192a. Accordingly, the fifth liquid crystal molecules 31e are tilted in a direction substantially parallel with the fifth fringe field F5, and then collide with each other and tilt in the direction substantially parallel with the longitudinal direction in which the first branch electrode 192a extends.

Further, a third portion 31f1 and a fourth portion 31f2 of sixth liquid crystal molecules 31f corresponding to the first plate-shaped portion 193a of the first subpixel electrode 191a are primarily tilted in a direction that is substantially perpendicular to (or normal to) the edge of the cutout 271 by the sixth fringe field F6, which is applied to the cross-shaped cutout 271 formed at the common electrode 270. Said third portion 31f1 and a fourth portion 31f2 of sixth liquid crystal molecules then secondarily align in a direction such that the deformation is reduced (e.g., minimized) when the third portion 31f1 and the fourth portion 31f2 of the sixth liquid crystal molecules 31f meet each other. The secondarily aligned direction refers to a vector sum direction of the directions in which the third portion 31f1 and the fourth portion 31f2 head (e.g., are oriented). Accordingly, the third portion 31f1 and the fourth portion 31f2 are tilted in a direction substantially parallel with the longitudinal direction in which the first branch electrode 192a extends.

As such, according to the example embodiment of the present invention, the first subpixel electrode 191a, to which a relatively high voltage is applied, is formed at the center to overlap with the center of the cross-shaped cutout 271 of the common electrode 270, and the plurality of first branch electrodes 192a are formed at the edge of the first subpixel electrode 191a. Further, the second subpixel electrode 191b, to which a relatively low voltage is applied, is disposed at the edge of the first subpixel electrode 191a, and the plurality of second branch electrodes 192b is formed at the edge of the second subpixel electrode 191b. In addition, by forming the third electrode 191c at the position overlapping the separation portion of the first subpixel electrode 191a and the second subpixel electrode 191b, the liquid crystal molecules disposed on the boundary of the first subpixel electrode 191a and the second subpixel electrode 191b are tilted substantially in parallel in substantially the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a and the second branch electrode 192b and the second subpixel electrode 191b have the plurality of minute branches 194a, 194b, 194c, 194d, 194e, 196f, 194g, and 194h, which extend in different directions, and as a result, the liquid crystal molecules are tilted in different directions. Accordingly, a viewing angle of the liquid crystal display is increased.

Figure 15:
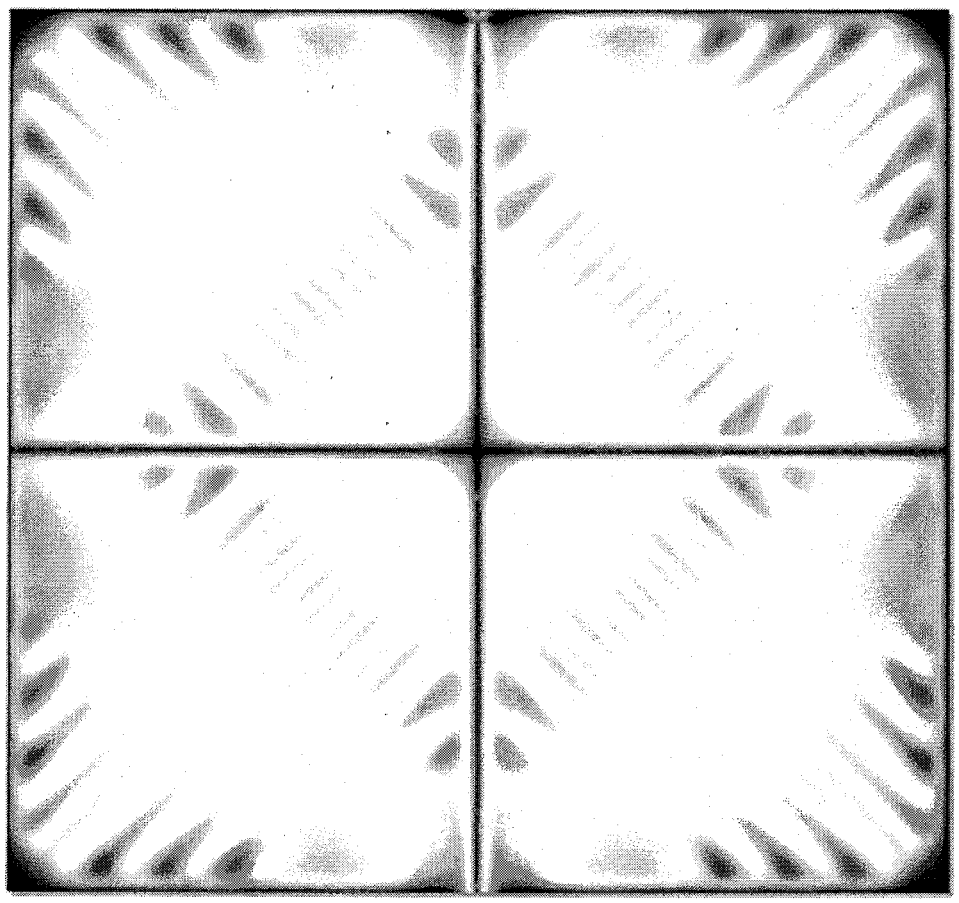
FIG. 15 is an electron micrograph illustrating a result of a first experimental example of the present invention.
Figure 16:
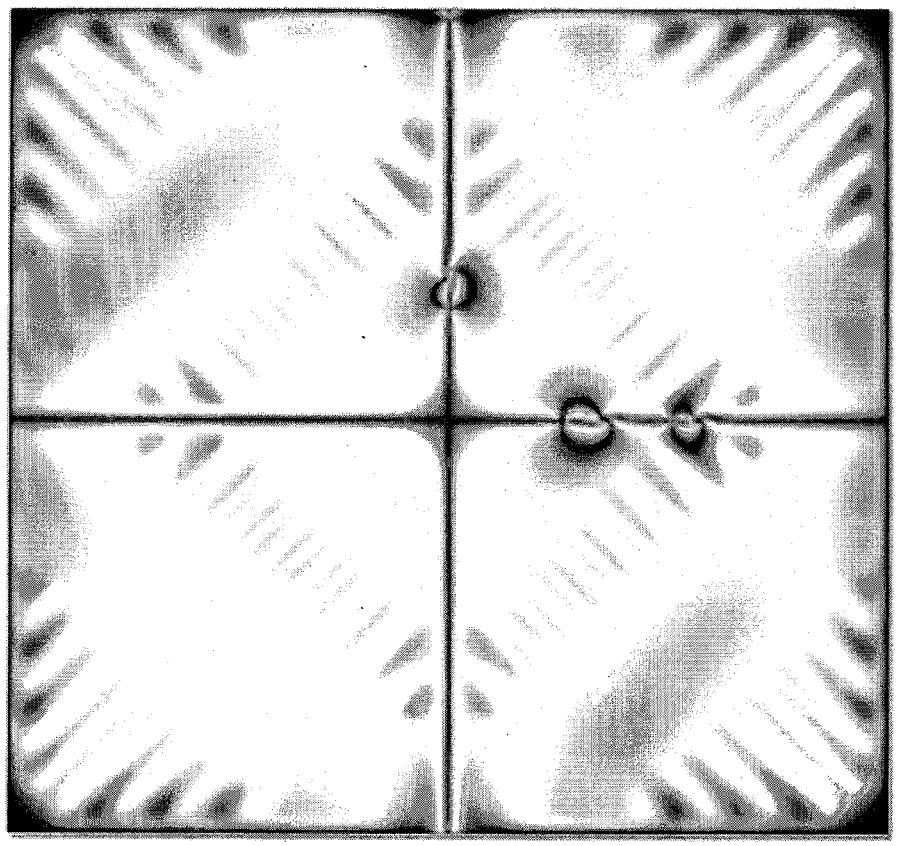
FIG. 16 to FIG. 19 are plan views illustrating a basic region of a field generating electrode of the liquid crystal display according to the example embodiment of the present invention.

Next, a result of a third experimental example of the present invention will be described with reference to FIG. 15 and FIG. 16. FIG. 15 and FIG. 16 are electron micrographs illustrating a result of the third experimental example of the present invention.

In the experimental example, while a ratio of the voltage applied to the second subpixel electrode 191b to the voltage applied to the first subpixel electrode 191a is about 0.83, the luminance of the liquid crystal display is measured by the electron microscope and is shown in FIG. 15.

Also, while a ratio of the voltage applied to the second subpixel electrode 191b to the voltage applied to the first subpixel electrode 191a is about 0.75, after the pressure is applied outside the liquid crystal display and a time (e.g., a predetermined time) has passed, the luminance of the liquid crystal display is measured by the electron microscope and is shown in FIG. 16.

Referring to FIG. 15, according to the present example embodiment, it may be confirmed that the direction of the liquid crystal molecules may be well controlled at the boundary portion of the first subpixel electrode and the second subpixel electrode.

Referring to FIG. 16, according to the present example embodiment, although the movement of the liquid crystal molecule is irregular by the external pressure, it may be confirmed that the liquid crystal molecule may be easily restored to the original position.

Next, a liquid crystal display according to another example embodiment of the present invention will be described with reference to FIG. 17 to FIG. 20. FIG. 17 to FIG. 20 are top plan views of a basic region of a field generating electrode of a liquid crystal display according to another example embodiment of the present invention.

The detailed configuration of the liquid crystal display according to the present example embodiment is substantially the same as the liquid crystal display according to the example embodiment described with reference to FIG. 10 and FIG. 11. Accordingly, the detailed description of the same constituent elements may not be provided.

However, differently from the liquid crystal display according to the example embodiment described with reference to FIG. 10 and FIG. 11, in the liquid crystal display according to the present example embodiment, the first branch electrode 192a of the first subpixel electrode 191a overlaps a portion of the second plate-shaped portion 193b of the second subpixel electrode 191b.

Figure 17:
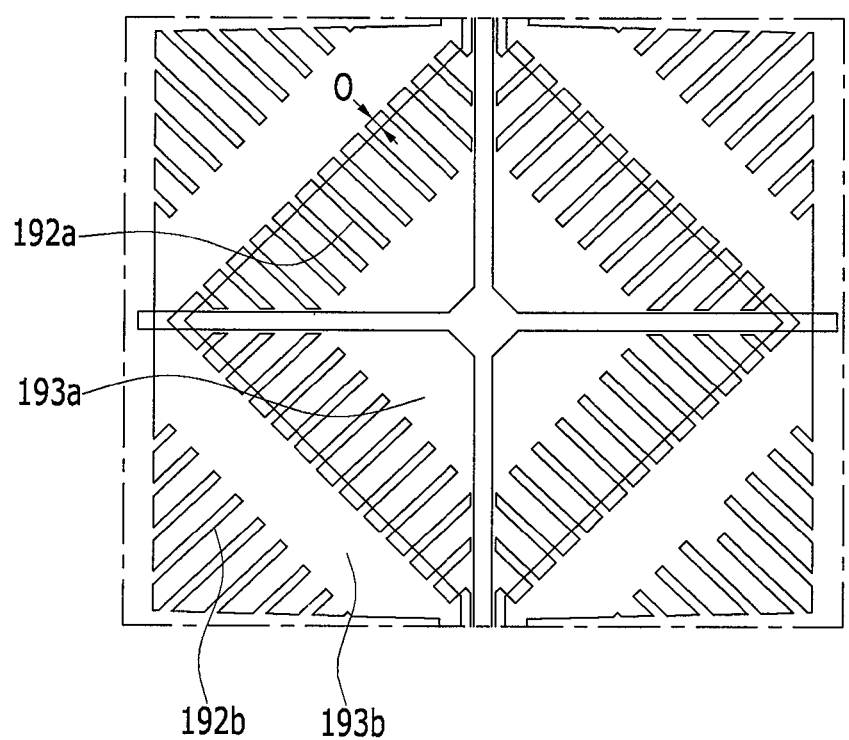

Referring to FIG. 17, the first branch electrode 192a of the first subpixel electrode 191a partially overlaps the entire surface of the second plate-shaped portion 193b of the second subpixel electrode 191b enclosing the first branch electrode 192a. The overlapping width O may be about 3 μm.

Figure 18:
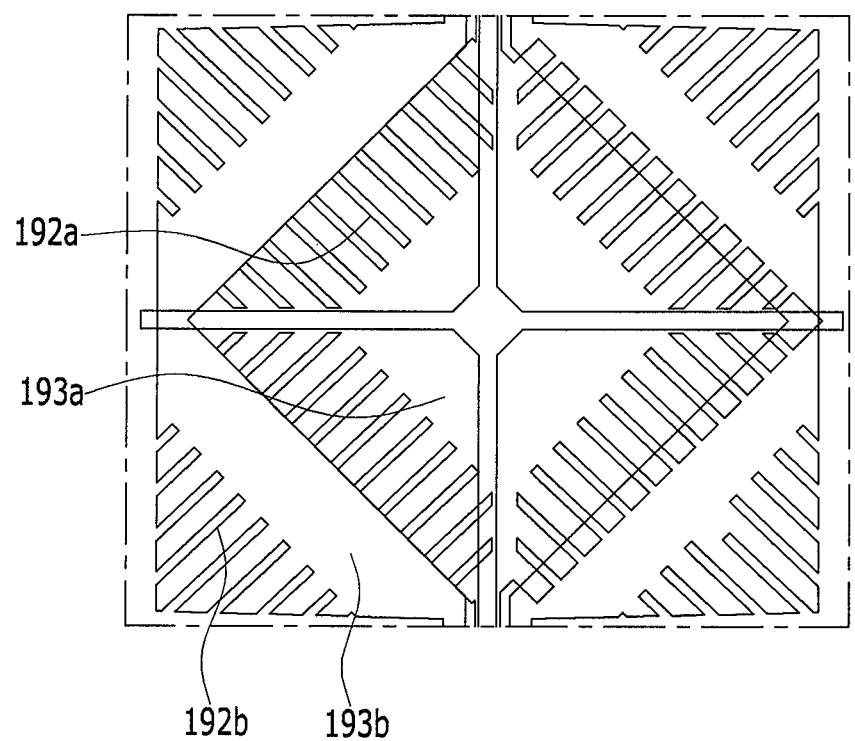
Figure 19:
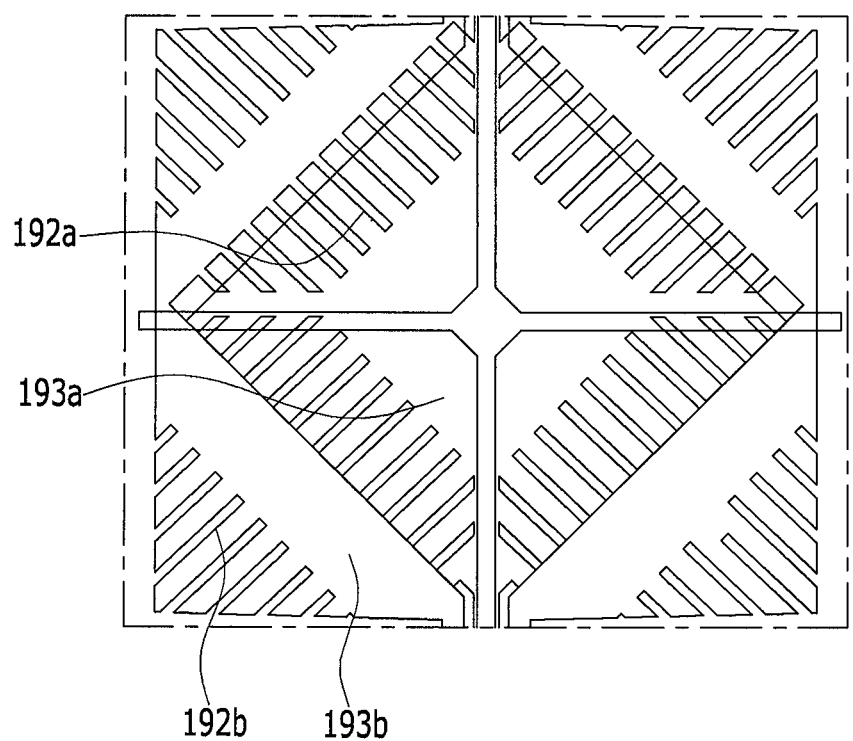
Figure 20:
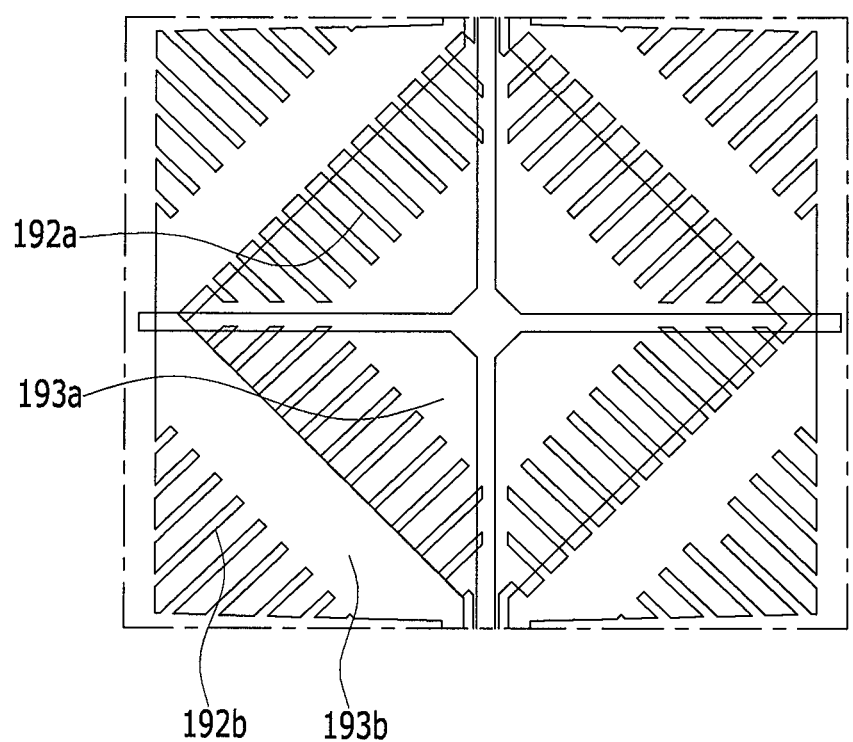
FIG. 20 to FIG. 24 are electron micrographs illustrating a result of a first experimental example of the present invention.
Figure 21:
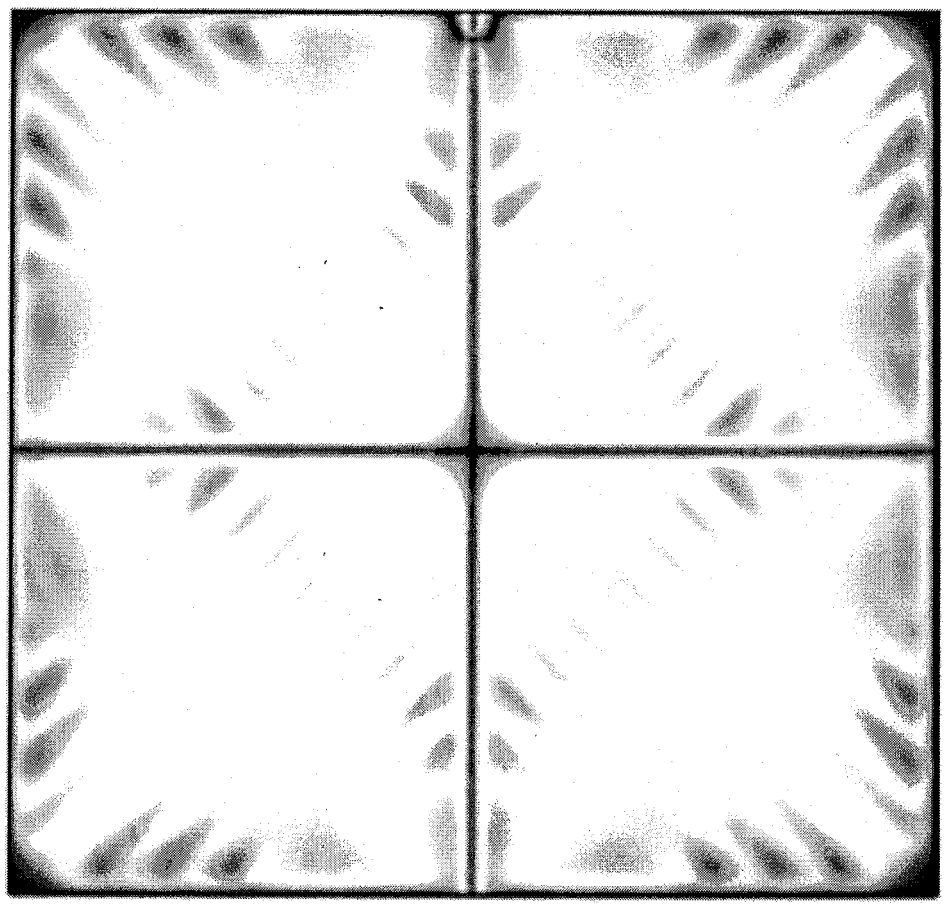
Figure 22:
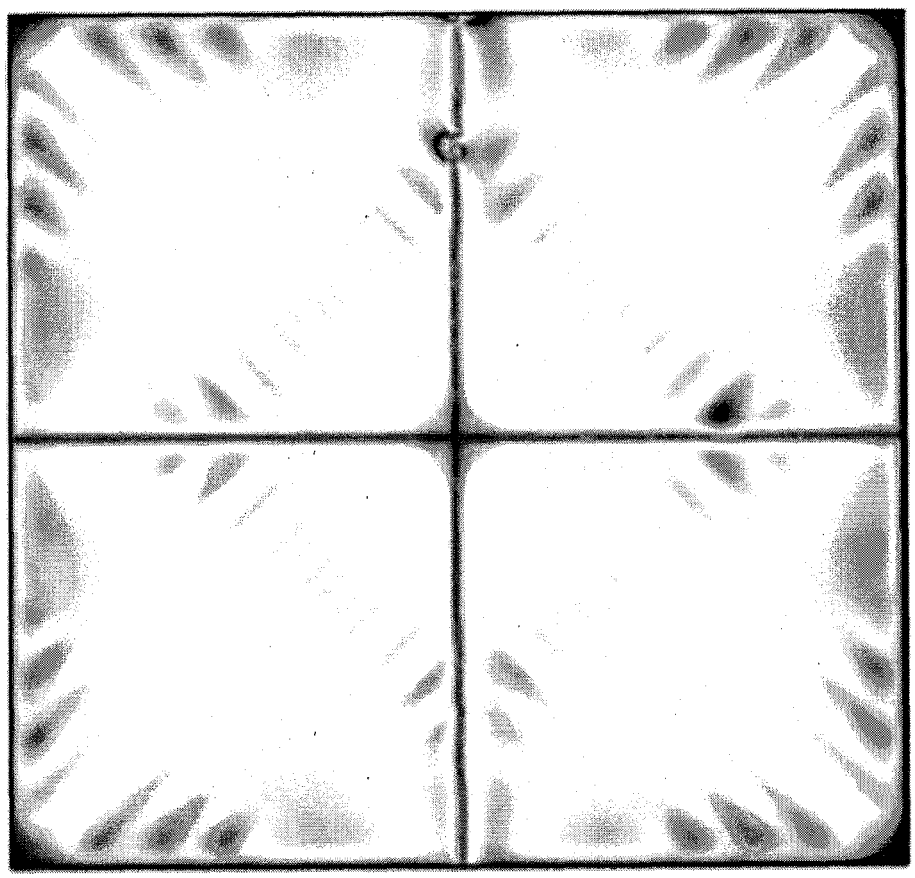
Figure 23:
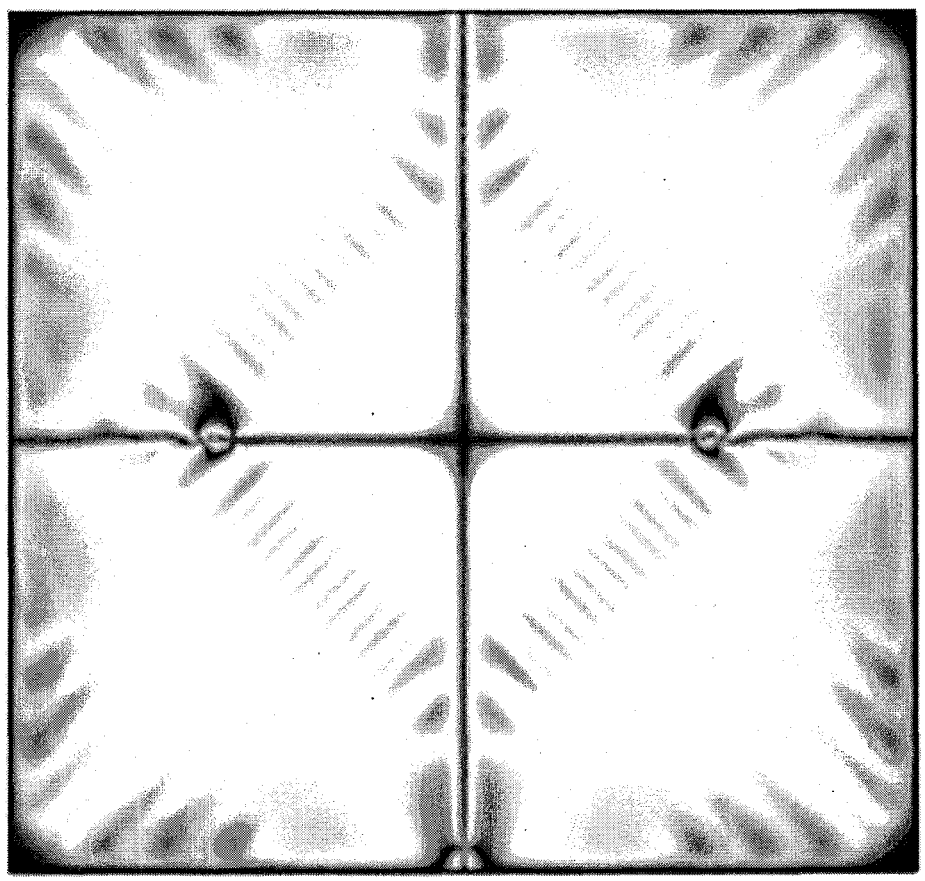
Figure 24:
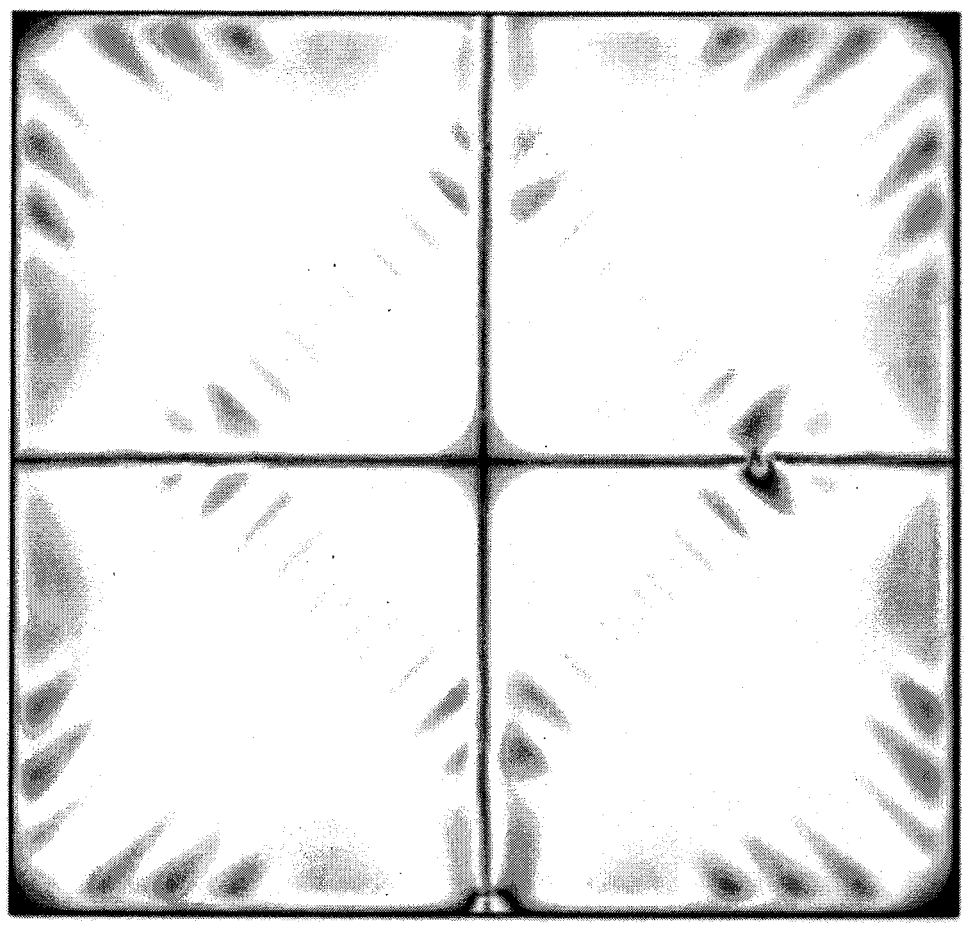

Referring to FIG. 18 to FIG. 20, when the first subpixel electrode 191a and the second subpixel electrode 191b are misaligned in the manufacturing process, the gap or interval may not be generated between the first subpixel electrode 191a and the second subpixel electrode 191b. That is, in a top view point of the liquid crystal display, the edges close to the second subpixel electrode 191b among the edges of the first branch electrode 192a and the edges close to the first subpixel electrode 191a among the edges of the second plate-shaped portion 193b overlap each other. Accordingly, even if the first subpixel electrode 191a and the second subpixel electrode 191b are misaligned in the manufacturing process, the irregular movement of the liquid crystal molecule (that may be generated between the first subpixel electrode 191a and the second subpixel electrode 191b) may be reduced (e.g., prevented).

Many characteristics of the liquid crystal display according to the example embodiment described with reference to FIG. 10 to FIG. 16 may be applied to the liquid crystal display according to the present example embodiment.

Next, a fourth experimental example of the present invention will be described with reference to FIG. 21 to FIG. 24. FIG. 21 to FIG. 24 are electron micrographs illustrating a result of the fourth experimental example of the present invention.

In the present experimental example, as shown in FIG. 17 to FIG. 20, after forming the first subpixel electrode 191a and the second subpixel electrode 191b, the transmittance is measured by the electron microscope and the result is shown in FIG. 21 to FIG. 24.

Referring to FIG. 21 to FIG. 24, according to the present example embodiment, although the first subpixel electrode 191a and the second subpixel electrode 191b are misaligned in the manufacturing process, the direction of the liquid crystal molecules is controlled in the boundary portion of the first subpixel electrode 191a and the second subpixel electrode 191b such that it may be confirmed that the irregular movement of the liquid crystal molecule that may be generated between the first subpixel electrode 191a and the second subpixel electrode 191b may be reduced (e.g., prevented).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display comprising:
    a first substrate;
    a pixel electrode on the first substrate and comprising a first subpixel electrode and a second subpixel electrode separated from the first subpixel electrode;
    a second substrate facing the first substrate;
    a common electrode on the second substrate; and
    a liquid crystal layer between the first substrate and the second substrate,
    wherein the first subpixel electrode comprises a first plate-shaped portion and a plurality of first branch electrodes extending from the first plate-shaped portion,
    wherein the second subpixel electrode comprises a second plate-shaped portion configured to enclose surroundings of the first branch electrode and a plurality of second branch electrodes extending from the second plate-shaped portion, and
    wherein a difference between a first voltage applied to the first subpixel electrode and a common voltage applied to the common electrode is larger than a difference between a second voltage applied to the second subpixel electrode and the common voltage.

2. The liquid crystal display of claim 1, further comprising an insulating layer between the first subpixel electrode and the second subpixel electrode,
    wherein the first subpixel electrode is on the insulating layer and the second subpixel electrode is under the insulating layer, and
    wherein an edge of the first branch electrode overlaps an edge of the second plate-shaped portion.

3. The liquid crystal display of claim 2,
    wherein the common electrode has a cross-shaped cutout, and
    wherein the first plate-shaped portion of the first subpixel electrode overlaps a center portion of the cross-shaped cutout.

4. The liquid crystal display of claim 3,
    wherein the first plate-shaped portion of the first subpixel electrode has a planar shape of a rhombus, and
    wherein the second plate-shaped portion of the second subpixel electrode has a planar shape including a plurality of trapezoid shapes.

5. The liquid crystal display of claim 4,
    wherein the plurality of first branch electrodes of the first subpixel electrode comprises a first minute branch, a second minute branch, a third minute branch, and a fourth minute branch extending in different directions, and
    wherein the plurality of second branch electrodes of the second subpixel electrode comprise a fifth minute branch, a sixth minute branch, a seventh minute branch, and an eighth minute branch extending in different directions.

6. The liquid crystal display of claim 1, further comprising:
    an insulating layer under the first subpixel electrode and the second subpixel electrode; and
    a third electrode under the insulating layer,
    wherein the third electrode overlaps, and is between, the first branch electrode of the first subpixel electrode and the second plate-shaped portion of the second subpixel electrode.

7. The liquid crystal display of claim 6, wherein the third electrode is configured to receive a voltage of substantially the same magnitude as the first subpixel electrode.

8. The liquid crystal display of claim 7,
    wherein the common electrode has a cross-shaped cutout, and
    wherein the first plate-shaped portion of the first subpixel electrode overlaps a center portion of the cross-shaped cutout.

9. The liquid crystal display of claim 8,
    wherein the first plate-shaped portion of the first subpixel electrode has a planar shape of a rhombus, and
    wherein the second plate-shaped portion of the second subpixel electrode has a planar shape including a plurality of trapezoid shapes.

10. The liquid crystal display of claim 9,
    wherein the plurality of first branch electrodes of the first subpixel electrode comprise a first minute branch, a second minute branch, a third minute branch, and a fourth minute branch extending in different directions, and
    wherein the plurality of second branch electrodes of the second subpixel electrode comprise a fifth minute branch, a sixth minute branch, a seventh minute branch, and an eighth minute branch extending in different directions.

11. The liquid crystal display of claim 1,
    wherein the common electrode has a cross-shaped cutout, and wherein the first plate-shaped portion of the first subpixel electrode overlaps a center portion of the cross-shaped cutout.

12. The liquid crystal display of claim 11,
wherein the first plate-shaped portion of the first subpixel electrode has a planar shape of a rhombus, and
wherein the second plate-shaped portion of the second subpixel electrode has a planar shape including a plurality of trapezoid shapes.

13. The liquid crystal display of claim 12,
wherein the plurality of first branch electrodes of the first subpixel electrode comprise a first minute branch, a second minute branch, a third minute branch, and a fourth minute branch extending in different directions; and
wherein the plurality of second branch electrodes of the second subpixel electrode comprise a fifth minute branch, a sixth minute branch, a seventh minute branch, and an eighth minute branch extending in different directions.

14. The liquid crystal display of claim 13,
wherein a distance between the first subpixel electrode and the second subpixel electrode, as measured along a direction substantially parallel with an extending direction of any one of the plurality of first branch electrodes and the plurality of second branch electrodes, is less than or equal to about 4 μm, and
wherein a ratio of the voltage applied to the second subpixel electrode to the voltage applied to the first subpixel electrode is less than or equal to about 0.83.

15. The liquid crystal display of claim 13,
wherein a distance between the first subpixel electrode and the second subpixel electrode, as measured along a direction substantially parallel with an extending direction of any one of the plurality of first branch electrodes and the plurality of second branch electrodes, is greater than about 4 μm and less than or equal to about 4.5 μm, and
wherein a ratio of the voltage applied to the second subpixel electrode to the voltage applied to the first subpixel electrode is less than or equal to about 0.75.

16. The liquid crystal display of claim 13,
wherein a distance between the first subpixel electrode and the second subpixel electrode, as measured along a direction substantially parallel with an extending direction of any one of the plurality of first branch electrodes and the plurality of second branch electrodes is greater than or equal to about 5 μm, and
wherein a ratio of the voltage applied to the second subpixel electrode to the voltage applied to the first subpixel electrode is less than or equal to about 0.7.

17. The liquid crystal display of claim 13, wherein
one-half of an entire width of the first plate-shaped portion of the first subpixel electrode, as measured along a direction substantially parallel with an extending direction of any one of the plurality of first branch electrodes and the plurality of second branch electrodes, is less than or equal to about 25 μm.

18. The liquid crystal display of claim 17, wherein
a width of the second plate-shaped portion of the second subpixel electrode, as measured along a direction substantially parallel with an extending direction of any one of the plurality of first branch electrodes and the plurality of second branch electrodes, is less than or equal to about 25 μm.

19. The liquid crystal display of claim 17, wherein
lengths of the plurality of first branch electrodes and the plurality of second branch electrodes are less than or equal to about 25 μm.

* * * * *